United States Patent [19]

Sugimura

[11] Patent Number: 5,280,440
[45] Date of Patent: Jan. 18, 1994

[54] PARALLEL ADDING CIRCUIT USING 3×3 MATRIX OF ± QUINARY NUMBER REPRESENTATION

[76] Inventor: Yukichi Sugimura, 2834-1, Nishikaizuka, Iwata-shi, Shizuoka-ken, Japan

[21] Appl. No.: 773,727

[22] Filed: Oct. 9, 1991

[51] Int. Cl.$^5$ .......................... G06F 7/50; G06F 7/38
[52] U.S. Cl. .................................. 364/768; 364/746.2
[58] Field of Search ................ 364/746.2, 768, 715.01, 364/778, 781

[56] References Cited

U.S. PATENT DOCUMENTS

| 4,620,188 | 10/1986 | Sengchanh | 364/746.2 |
| 4,914,614 | 4/1990 | Yamakawa | 364/746.2 |

FOREIGN PATENT DOCUMENTS

| 56-33733 | 4/1981 | Japan . |
| 57-93446 | 6/1982 | Japan . |
| 59-139445 | 8/1984 | Japan . |

OTHER PUBLICATIONS

"Fast Multiplication by ± Quinary", Y. Sugimura, Systems Computers Controls, vol. 11, No. 5, Sep.-Oct. 1980, pp. 9-19.

"± Quinary Parallel Adding Circuit and Multiplication", Y. Sugimura, IEICE Transactions, vol. J71-D No. 2, Feb. 1988, pp. 193-203.

"A VLSI-Oriented High-Speed Multipler Using A Redundant Binary Addition Tree," N. Takagi, IEICE Transaction, vol. J66-D, Jun. 1983, pp. 638-690.

"A VLSI-Oriented High-Speed Divider Using Redundant Binary Representation", N. Takagi, IEICE Transaction, vol. J67-D, Aor. 1984, pp. 450-457.

"Signed-Digit Number Representations for Fast Parallel Arithmetic", A. Avizienis, IRE Transactions on Electronic Computer, Sep. 1981, pp. 389-400.

Primary Examiner—Long T. Nguyen
Attorney, Agent, or Firm—Finnegan, Henderson, Farabow, Garrett & Dunner

[57] ABSTRACT

A parallel adding circuit using a quinary number representation including a register having a sign bit, numeral bits and a special bit. The sign bit equal to 1 indicates positive and sign bit equal to 0 indicates negative. The numeral bits includes a first, second and third bits representing weights of 3, 2 and 1, respectively. The special bit is formed by a logical AND of an inverse (logical NOT) of said second bit and an inverse (logical NOT) of said third bit.

22 Claims, 32 Drawing Sheets

FIG.1 ±Quinary numbers corresponding to "-24~65" in decimal numbers 6 5

| $1\bar{4}\bar{4}$ | $1\bar{4}\bar{3}$ | $1\bar{4}\bar{2}$ | $1\bar{4}\bar{1}$ | $1\bar{4}0$ | $1\bar{4}1$ | $1\bar{4}2$ | $1\bar{4}3$ | $1\bar{4}4$ | $1\bar{4}5$ |
|---|---|---|---|---|---|---|---|---|---|
| $5\bar{4}$ | $5\bar{3}$ | $5\bar{2}$ | $5\bar{1}$ | $50$ | $51$ | $52$ | $53$ | $54$ | $55$ |
| $4\bar{4}$ | $4\bar{3}$ | $4\bar{2}$ | $4\bar{1}$ | $40$ | $41$ | $42$ | $43$ | $44$ | $45$ |
| $3\bar{4}$ | $3\bar{3}$ | $3\bar{2}$ | $3\bar{1}$ | $30$ | $31$ | $32$ | $33$ | $34$ | $35$ |
| $2\bar{4}$ | $2\bar{3}$ | $2\bar{2}$ | $2\bar{1}$ | $20$ | $21$ | $22$ | $23$ | $24$ | $25$ |
| $1\bar{4}$ | $1\bar{3}$ | $1\bar{2}$ | $1\bar{1}$ | $10$ | $11$ | $12$ | $13$ | $14$ | $15$ |
| $\bar{4}$ | $\bar{3}$ | $\bar{2}$ | $\bar{1}$ | $0$ | $1$ | $2$ | $3$ | $4$ | $5$ |
| $\bar{1}\bar{4}$ | $\bar{1}\bar{3}$ | $\bar{1}\bar{2}$ | $\bar{1}\bar{1}$ | $\bar{1}0$ | $\bar{1}1$ | $\bar{1}2$ | $\bar{1}3$ | $\bar{1}4$ | $\bar{1}5$ |
| $\bar{2}\bar{4}$ | $\bar{2}\bar{3}$ | $\bar{2}\bar{2}$ | $\bar{2}\bar{1}$ | $\bar{2}0$ | $\bar{2}1$ | $\bar{2}2$ | $\bar{2}3$ | $\bar{2}4$ | $\bar{2}5$ |

−2 4

FIG.2  "S, 3, 2, 1, 0" code for ±quinary

| ±quinary | sign | weight | | | $\bar{X}_2\,\bar{X}_1$ |
|---|---|---|---|---|---|
| | | 3 | 2 | 1 | |
| | $X_S$ | $X_3$ | $X_2$ | $X_1$ | $X_0$ |
| 5 | 1 = + | 1 | 1 | 0 | 0 |
| 4 | | 1 | 0 | 1 | 0 |
| 3 | | 1 | 0 | 0 | 1 |
| 2 | 0 = − | 0 | 1 | 0 | 0 |
| 1 | | 0 | 0 | 1 | 0 |
| 0 | | 0 | 0 | 0 | 1 |

FIG.3 Register for "S, 3, 2, 1, 0" code
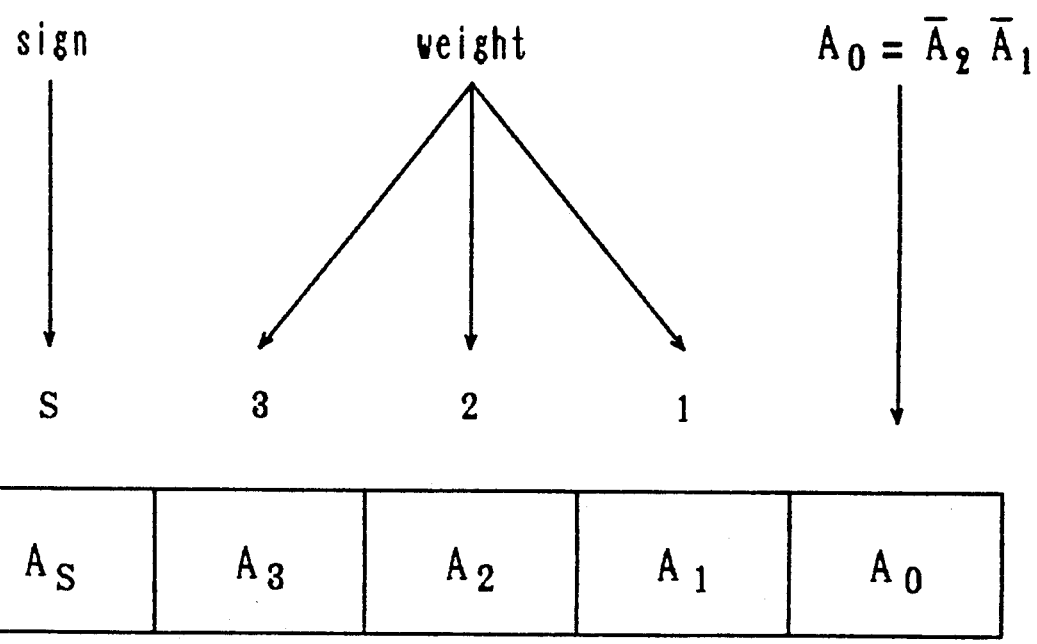

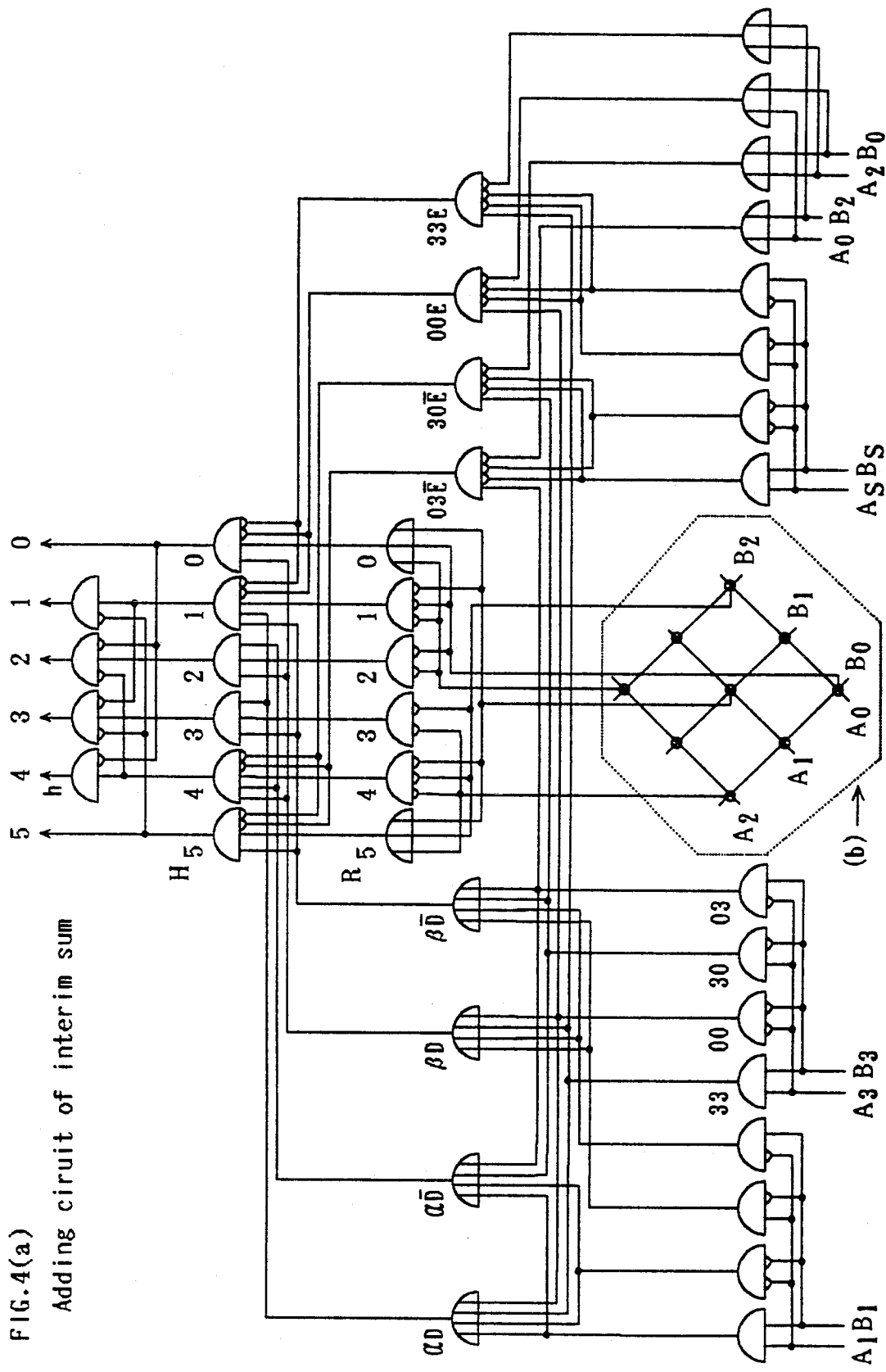
FIG.4(a) Adding ciruit of interim sum

FIG.5 Pattern of interim sums and carries at 9 intersections (22)

|   |    | E  |    | Ē  |    |
|---|----|----|----|----|----|
|   |    | ++ | -- | +- | -+ |
| D | 00 | 4  | 4̄  | 0  | 0  |
|   | 33 | 10 | 1̄0̄ | 0  | 0  |
| D̄ | 03 | 1̄3̄ | 1̄3̄ | 3̄  | 3  |
|   | 30 | 1̄3̄ | 1̄3̄ | 3  | 3̄  |

(20)

|   |    | E  |    | Ē  |    |
|---|----|----|----|----|----|
|   |    | ++ | -- | +- | -+ |
| D | 00 | 2  | 2̄  | 2  | 2̄  |
|   | 33 | 1̄2̄ | 1̄2̄ | 2  | 2̄  |
| D̄ | 03 | 5  | 5̄  | 1̄  | 1  |
|   | 30 | 5  | 5̄  | 5  | 5̄  |

(10)

|   |    | E  |    | Ē  |    |
|---|----|----|----|----|----|
|   |    | ++ | -- | +- | -+ |
| D | 00 | 1  | 1̄  | 1  | 1̄  |
|   | 33 | 1̄3̄ | 1̄3̄ | 1  | 1̄  |
| D̄ | 03 | 4  | 4̄  | 2̄  | 2  |
|   | 30 | 4  | 4̄  | 4  | 4̄  |

(21)

|   |    | E  |    | Ē  |    |
|---|----|----|----|----|----|
|   |    | ++ | -- | +- | -+ |
| D | 00 | 3  | 3̄  | 1  | 1̄  |
|   | 33 | 1̄1̄ | 1̄1̄ | 1  | 1̄  |
| D̄ | 03 | 1̄4̄ | 1̄4̄ | 2̄  | 2  |
|   | 30 | 1̄4̄ | 1̄4̄ | 4  | 4̄  |

(02)

|   |    | E  |    | Ē  |    |
|---|----|----|----|----|----|
|   |    | ++ | -- | +- | -+ |
| D | 00 | 2  | 2̄  | 2̄  | 2  |
|   | 33 | 1̄2̄ | 1̄2̄ | 2̄  | 2  |
| D̄ | 03 | 5  | 5̄  | 5̄  | 5  |
|   | 30 | 5  | 5̄  | 1  | 1̄  |

(01)

|   |    | E  |    | Ē  |    |
|---|----|----|----|----|----|
|   |    | ++ | -- | +- | -+ |
| D | 00 | 1  | 1̄  | 1̄  | 1  |
|   | 33 | 1̄3̄ | 1̄3̄ | 1̄  | 1  |
| D̄ | 03 | 4  | 4̄  | 4̄  | 4  |
|   | 30 | 4  | 4̄  | 2  | 2̄  |

(12)

|   |    | E  |    | Ē  |    |
|---|----|----|----|----|----|
|   |    | ++ | -- | +- | -+ |
| D | 00 | 3  | 3̄  | 1̄  | 1  |
|   | 33 | 1̄1̄ | 1̄1̄ | 1̄  | 1  |
| D̄ | 03 | 1̄4̄ | 1̄4̄ | 4̄  | 4  |
|   | 30 | 1̄4̄ | 1̄4̄ | 2  | 2̄  |

(11)

|   |    | E  |    | Ē  |    |
|---|----|----|----|----|----|
|   |    | ++ | -- | +- | -+ |
| D | 00 | 2  | 2̄  | 0  | 0  |
|   | 33 | 1̄2̄ | 1̄2̄ | 0  | 0  |
| D̄ | 03 | 5  | 5̄  | 3̄  | 3  |
|   | 30 | 5  | 5̄  | 3  | 3̄  |

(00)

|   |    | E  |    | Ē  |    |
|---|----|----|----|----|----|
|   |    | ++ | -- | +- | -+ |
| D | 00 | 0  | 0  | 0  | 0  |
|   | 33 | 1̄4̄ | 1̄4̄ | 0  | 0  |
| D̄ | 03 | 3  | 3̄  | 3̄  | 3  |
|   | 30 | 3  | 3̄  | 3  | 3̄  |

FIG.6  Pattern of interim sums absolute value at 9 intersections (22)

|   |    | E |   | Ē |   |
|---|----|---|---|---|---|
|   |    | + + | − − | + − | − + |
| D | 00 | 4 | 4 | 0 | 0 |
|   | 33 | 0 | 0 | 0 | 0 |
| D̄ | 03 | 3 | 3 | 3 | 3 |
|   | 30 | 3 | 3 | 3 | 3 |

(20)

|   |    | E |   | Ē |   |
|---|----|---|---|---|---|
|   |    | + + | − − | + − | − + |
| D | 00 | 2 | 2 | 2 | 2 |
|   | 33 | 2 | 2 | 2 | 2 |
| D̄ | 03 | 5 | 5 | 1 | 1 |
|   | 30 | 5 | 5 | 5 | 5 |

(10)

|   |    | E |   | Ē |   |
|---|----|---|---|---|---|
|   |    | + + | − − | + − | − + |
| D | 00 | 1 | 1 | 1 | 1 |
|   | 33 | 3 | 3 | 1 | 1 |
| D̄ | 03 | 4 | 4 | 2 | 2 |
|   | 30 | 4 | 4 | 4 | 4 |

(21)

|   |    | E |   | Ē |   |
|---|----|---|---|---|---|
|   |    | + + | − − | + − | − + |
| D | 00 | 3 | 3 | 1 | 1 |
|   | 33 | 1 | 1 | 1 | 1 |
| D̄ | 03 | 4 | 4 | 2 | 2 |
|   | 30 | 4 | 4 | 4 | 4 |

(02)

|   |    | E |   | Ē |   |
|---|----|---|---|---|---|
|   |    | + + | − − | + − | − + |
| D | 00 | 2 | 2 | 2 | 2 |
|   | 33 | 2 | 2 | 2 | 2 |
| D̄ | 03 | 5 | 5 | 5 | 5 |
|   | 30 | 5 | 5 | 1 | 1 |

(01)

|   |    | E |   | Ē |   |
|---|----|---|---|---|---|
|   |    | + + | − − | + − | − + |
| D | 00 | 1 | 1 | 1 | 1 |
|   | 33 | 3 | 3 | 1 | 1 |
| D̄ | 03 | 4 | 4 | 4 | 4 |
|   | 30 | 4 | 4 | 2 | 2 |

(12)

|   |    | E |   | Ē |   |
|---|----|---|---|---|---|
|   |    | + + | − − | + − | − + |
| D | 00 | 3 | 3 | 1 | 1 |
|   | 33 | 1 | 1 | 1 | 1 |
| D̄ | 03 | 4 | 4 | 4 | 4 |
|   | 30 | 4 | 4 | 2 | 2 |

(11)

|   |    | E |   | Ē |   |
|---|----|---|---|---|---|
|   |    | + + | − − | + − | − + |
| D | 00 | 2 | 2 | 0 | 0 |
|   | 33 | 2 | 2 | 0 | 0 |
| D̄ | 03 | 5 | 5 | 3 | 3 |
|   | 30 | 5 | 5 | 3 | 3 |

(00)

|   |    | E |   | Ē |   |
|---|----|---|---|---|---|
|   |    | + + | − − | + − | − + |
| D | 00 | 0 | 0 | 0 | 0 |
|   | 33 | 4 | 4 | 0 | 0 |
| D̄ | 03 | 3 | 3 | 3 | 3 |
|   | 30 | 3 | 3 | 3 | 3 |

FIG.7  Relation between turned ON gates R and intersections

|   |      |       |       |       |       |       |       |
|---|------|-------|-------|-------|-------|-------|-------|
| α | (21) |       | $R_4$ | $R_3$ | $R_2$ | $R_1$ |       |
|   | (12) |       | $R_4$ | $R_3$ | $R_2$ | $R_1$ |       |
|   | (10) |       | $R_4$ | $R_3$ | $R_2$ | $R_1$ |       |
|   | (01) |       | $R_4$ | $R_3$ | $R_2$ | $R_1$ |       |
| β | (22) |       | $R_4$ | $R_3$ |       |       | $R_0$ |
|   | (00) |       | $R_4$ | $R_3$ |       |       | $R_0$ |
|   | (20) | $R_5$ |       |       | $R_2$ | $R_1$ |       |
|   | (02) | $R_5$ |       |       | $R_2$ | $R_1$ |       |
|   | (11) | $R_5$ |       | $R_3$ | $R_2$ |       | $R_0$ |

FIG.8 Target gates H of $\beta\bar{D}$, $\beta D$, $\alpha\bar{D}$, $\alpha D$

| | | | | | | |
|---|---|---|---|---|---|---|
| $\beta\bar{D}$ | $(H_5)$ | | $H_3$ | | $H_1$ | |
| $\beta D$ | | $H_4$ | | $H_2$ | | $(H_0)$ |
| $\alpha\bar{D}$ | | $(H_4)$ | | $H_2$ | | |
| $\alpha D$ | | | $H_3$ | | $(H_1)$ | |

FIG.9  Positions of gates  E

|  | + + | - - | + - | - + |
|---|---|---|---|---|
| 0 0 | 0 0 E |  |  |  |
| 3 3 | 3 3 E |  |  |  |
| 0 3 |  |  | 0 3 $\bar{E}$ |  |
| 3 0 |  |  | 3 0 $\bar{E}$ |  |

FIG. 10  Operations by gates E
| Inter-sections | Main out-puts H | Sub out-puts h | Work prohibited intersections | Its' prevent circuit | Unrelated intersections |
|---|---|---|---|---|---|
| 0 0 E | (2 2)<br>(2 1)<br>(1 2)<br>(1 1) | 0 → 4<br>1 → 3<br>1 → 3<br>0 → 2 | (1 0)<br>(0 1)<br>(0 0) | 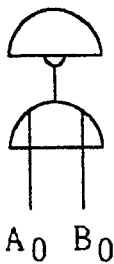 $A_0$ $B_0$ | (2 0)<br>(0 2) |
| 3 3 E | (1 0)<br>(0 1)<br>(0 0)<br>(1 1) | 1 → 3<br>1 → 3<br>0 → 4<br>0 → 2 | (2 2)<br>(2 1)<br>(1 2) | 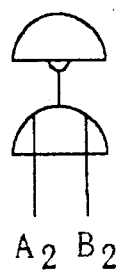 $A_2$ $B_2$ | (2 0)<br>(0 2) |
| 0 3 $\bar{E}$ | (2 1)<br>(1 0)<br>(2 0)<br>(1 1) | 4 → 2<br>4 → 2<br>5 → 1<br>5 → 3 | (1 2)<br>(0 1)<br>(0 2) | 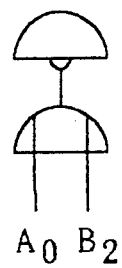 $A_0$ $B_2$ | (2 2)<br>(0 0) |
| 3 0 $\bar{E}$ | (1 2)<br>(0 2)<br>(0 1)<br>(1 1) | 4 → 2<br>5 → 1<br>4 → 2<br>5 → 3 | (2 1)<br>(2 0)<br>(1 0) | 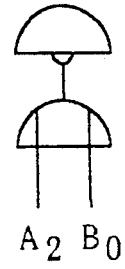 $A_2$ $B_0$ | (2 2)<br>(0 0) |

FIG.11 Gates H cut by gates E in connection with intersections intersections
(H gates cut operation is prohibited)

| | | | | | | | | |
|---|---|---|---|---|---|---|---|---|
| (12) (01) (02) | 03$\bar{E}$ | $H_5$ | $H_4$ | | | | | |
| (21) (20) (10) | 30$\bar{E}$ | $H_5$ | $H_4$ | | | | | |
| (10) (01) (00) | 00E | | | | | | $H_1$ | $H_0$ |
| (22) (21) (12) | 33E | | | | | | $H_1$ | $H_0$ |

| | | | | | |
|---|---|---|---|---|---|
| $\beta\bar{D}$ | ($H_5$) | | $H_3$ | | $H_1$ | |
| $\beta D$ | | $H_4$ | | $H_2$ | | ($H_0$) |
| $\alpha\bar{D}$ | | ($H_4$) | | $H_2$ | | |
| $\alpha D$ | | | $H_3$ | | ($H_1$) | |

| | | | | | | |
|---|---|---|---|---|---|---|
| $\alpha$ | (21) | | $R_4$ | $R_3$ | $R_2$ | $R_1$ | |
| | (12) | | $R_4$ | $R_3$ | $R_2$ | $R_1$ | |
| | (10) | | $R_4$ | $R_3$ | $R_2$ | $R_1$ | |
| | (01) | | $R_4$ | $R_3$ | $R_2$ | $R_1$ | |
| $\beta$ | (22) | | $R_4$ | $R_3$ | | | $R_0$ |
| | (00) | | $R_4$ | $R_3$ | | | $R_0$ |
| | (20) | $R_5$ | | | $R_2$ | $R_1$ | |
| | (02) | $R_5$ | | | $R_2$ | $R_1$ | |
| | (11) | $R_5$ | | $R_3$ | $R_2$ | | $R_0$ |

FIG. 12 Pattern of signs of interim sums "1~4"

(22)

|   |    | E   |   | $\bar{E}$ |   |
|---|----|-----|---|----|---|
|   |    | ++  | -- | +- | -+ |
| D | 00 | +   | - | 0  | 0 |
|   | 33 | 0   | 0 | 0  | 0 |
| $\bar{D}$ | 03 | - | + | - | + |
|   | 30 | -   | + | +  | - |

(20)

|   |    | E   |   | $\bar{E}$ |   |
|---|----|-----|---|----|---|
|   |    | ++  | -- | +- | -+ |
| D | 00 | +   | - | +  | - |
|   | 33 | -   | + | +  | - |
| $\bar{D}$ | 03 | 5 | $\bar{5}$ | - | + |
|   | 30 | 5   | $\bar{5}$ | 5 | $\bar{5}$ |

(10)

|   |    | E   |   | $\bar{E}$ |   |
|---|----|-----|---|----|---|
|   |    | ++  | -- | +- | -+ |
| D | 00 | +   | - | +  | - |
|   | 33 | -   | + | +  | - |
| $\bar{D}$ | 03 | + | - | - | + |
|   | 30 | +   | - | +  | - |

(21)

|   |    | E   |   | $\bar{E}$ |   |
|---|----|-----|---|----|---|
|   |    | ++  | -- | +- | -+ |
| D | 00 | +   | - | +  | - |
|   | 33 | -   | + | +  | - |
| $\bar{D}$ | 03 | - | + | - | + |
|   | 30 | -   | + | +  | - |

(02)

|   |    | E   |   | $\bar{E}$ |   |
|---|----|-----|---|----|---|
|   |    | ++  | -- | +- | -+ |
| D | 00 | +   | - | -  | + |
|   | 33 | -   | + | -  | + |
| $\bar{D}$ | 03 | 5 | $\bar{5}$ | $\bar{5}$ | 5 |
|   | 30 | 5   | $\bar{5}$ | + | - |

(01)

|   |    | E   |   | $\bar{E}$ |   |
|---|----|-----|---|----|---|
|   |    | ++  | -- | +- | -+ |
| D | 00 | +   | - | -  | + |
|   | 33 | -   | + | -  | + |
| $\bar{D}$ | 03 | + | - | - | + |
|   | 30 | +   | - | +  | - |

(12)

|   |    | E   |   | $\bar{E}$ |   |
|---|----|-----|---|----|---|
|   |    | ++  | -- | +- | -+ |
| D | 00 | +   | - | -  | + |
|   | 33 | -   | + | -  | + |
| $\bar{D}$ | 03 | - | + | - | + |
|   | 30 | -   | + | +  | - |

(11)

|   |    | E   |   | $\bar{E}$ |   |
|---|----|-----|---|----|---|
|   |    | ++  | -- | +- | -+ |
| D | 00 | +   | - | 0  | 0 |
|   | 33 | -   | + | 0  | 0 |
| $\bar{D}$ | 03 | 5 | $\bar{5}$ | - | + |
|   | 30 | 5   | $\bar{5}$ | + | - |

(00)

|   |    | E   |   | $\bar{E}$ |   |
|---|----|-----|---|----|---|
|   |    | ++  | -- | +- | -+ |
| D | 00 | 0   | 0 | 0  | 0 |
|   | 33 | -   | + | 0  | 0 |
| $\bar{D}$ | 03 | + | - | - | + |
|   | 30 | +   | - | +  | - |

FIG. 13 Positions of P(plus) and M(minus) which are common in all intersections

|  | ++ | -- | +- | -+ |
|---|---|---|---|---|
| 0 0 | $P_1$ |  |  |  |
| 3 3 |  | $P_2$ |  |  |
| 0 3 |  |  |  | $P_4$ |
| 3 0 |  |  | $P_3$ |  |

|  | ++ | -- | +- | -+ |
|---|---|---|---|---|
| 0 0 |  | $M_2$ |  |  |
| 3 3 | $M_1$ |  |  |  |
| 0 3 |  |  | $M_3$ |  |
| 3 0 |  |  |  | $M_4$ |

FIG.14 Four patterns of minus sign's destribution

|  |  | (2 2) |  |  |
|--|--|--|--|--|
|  |  | (2 1) |  |  |
|  |  | (2 0) |  |  |
|  | + + |  |  | − + |

| | | | |
|---|---|---|---|
| $P_1$ | | | − |
| − | | | − |
| − | | | $P_4$ |
| − | | | − |

0 0

0 3

$m_1$

|  |  | (2 2) |  |  |
|--|--|--|--|--|
|  |  | (1 2) |  |  |
|  |  | (0 2) |  |  |
|  | + + |  |  | + − |

| | | | |
|---|---|---|---|
| $P_1$ | | | − |
| − | | | − |
| − | | | − |
| − | | | $P_3$ |

0 0

3 0

$m_2$

|  |  | (0 2) |  |  |
|--|--|--|--|--|
|  |  | (0 1) |  |  |
|  |  | (0 0) |  |  |
|  | − − |  |  | + − |

| | | | |
|---|---|---|---|
| | − | − | |
| | $P_2$ | − | |
| | − | − | |
| | − | $P_3$ | |

3 3

3 0

$m_3$

|  |  | (2 0) |  |  |
|--|--|--|--|--|
|  |  | (1 0) |  |  |
|  |  | (0 0) |  |  |
|  | − − |  |  | − + |

| | | | |
|---|---|---|---|
| | − | | − |
| | $P_2$ | | − |
| | − | | $P_4$ |
| | − | | − |

3 3

0 3

$m_4$

FIG. 15 Four patterns of plus sign's destribution (2 2)
(2 1)
(2 0)
− − + −

| 0 0 |  | $M_2$ | + |  |
|---|---|---|---|---|
|  |  | + | + |  |
| 0 3 |  | + | $M_3$ |  |
|  |  | + | + |  |

$P_1$ (2 2)
(1 2)
(0 2)
− − − +

| 0 0 |  | $M_2$ |  | + |
|---|---|---|---|---|
|  |  | + |  | + |
|  |  | + |  | + |
| 3 0 |  | + |  | $M_4$ |

$P_2$ (0 2)
(0 1)
(0 0)
+ + − +

|  | + |  |  | + |
|---|---|---|---|---|
| 3 3 | $M_1$ |  |  | + |
|  | + |  |  | + |
| 3 0 | + |  |  | $M_4$ |

$P_3$ (2 0)
(1 0)
(0 0)
+ + + −

|  | + |  | + |  |
|---|---|---|---|---|
| 3 3 | $M_1$ |  | + |  |
| 0 3 | + |  | $M_3$ |  |
|  | + |  |  |  |

$P_4$

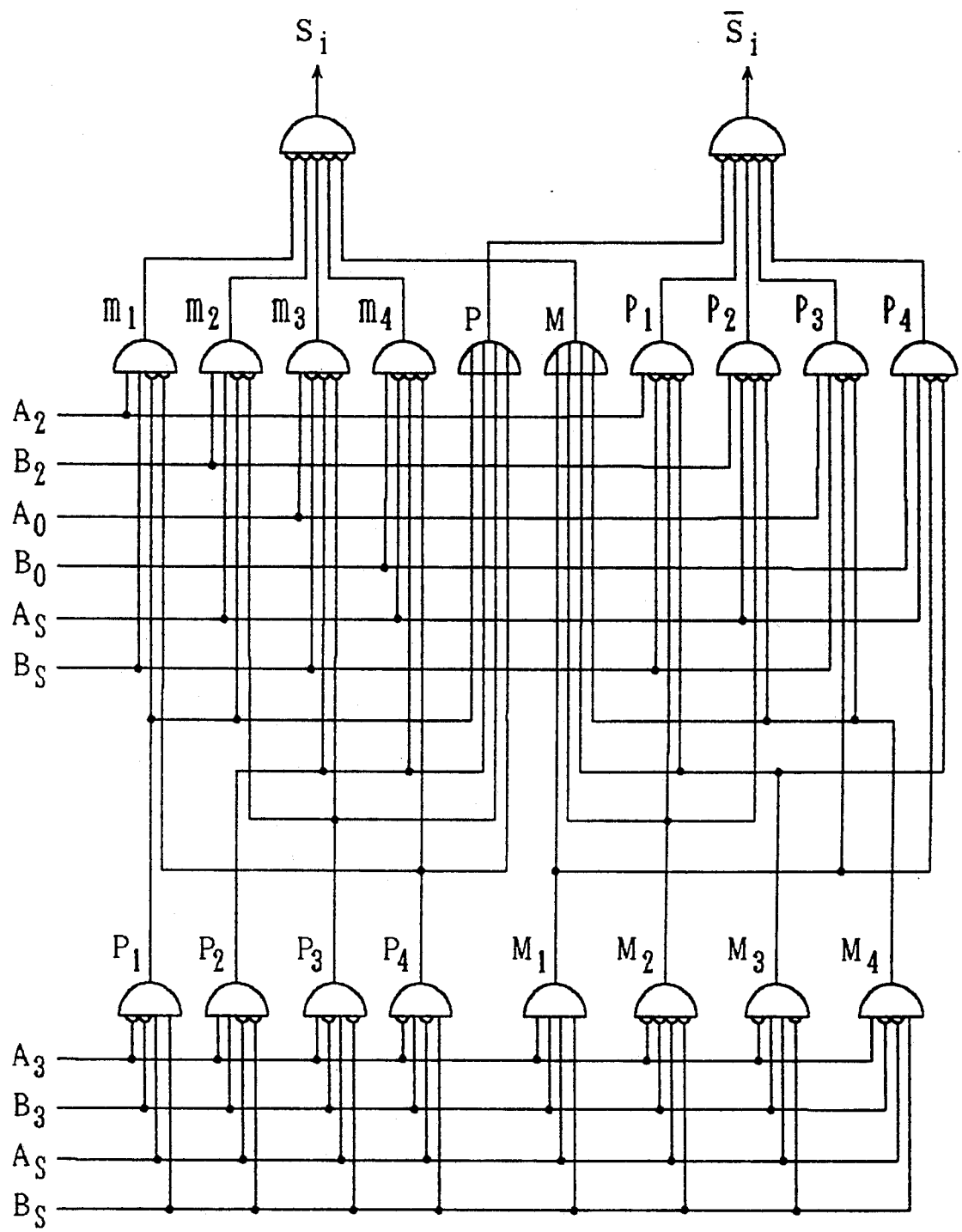
FIG.16 Sign circuit for interim sums "1~4"

FIG. 17 Selecting circuit in accordance with combinations of sign of interim sum and carry
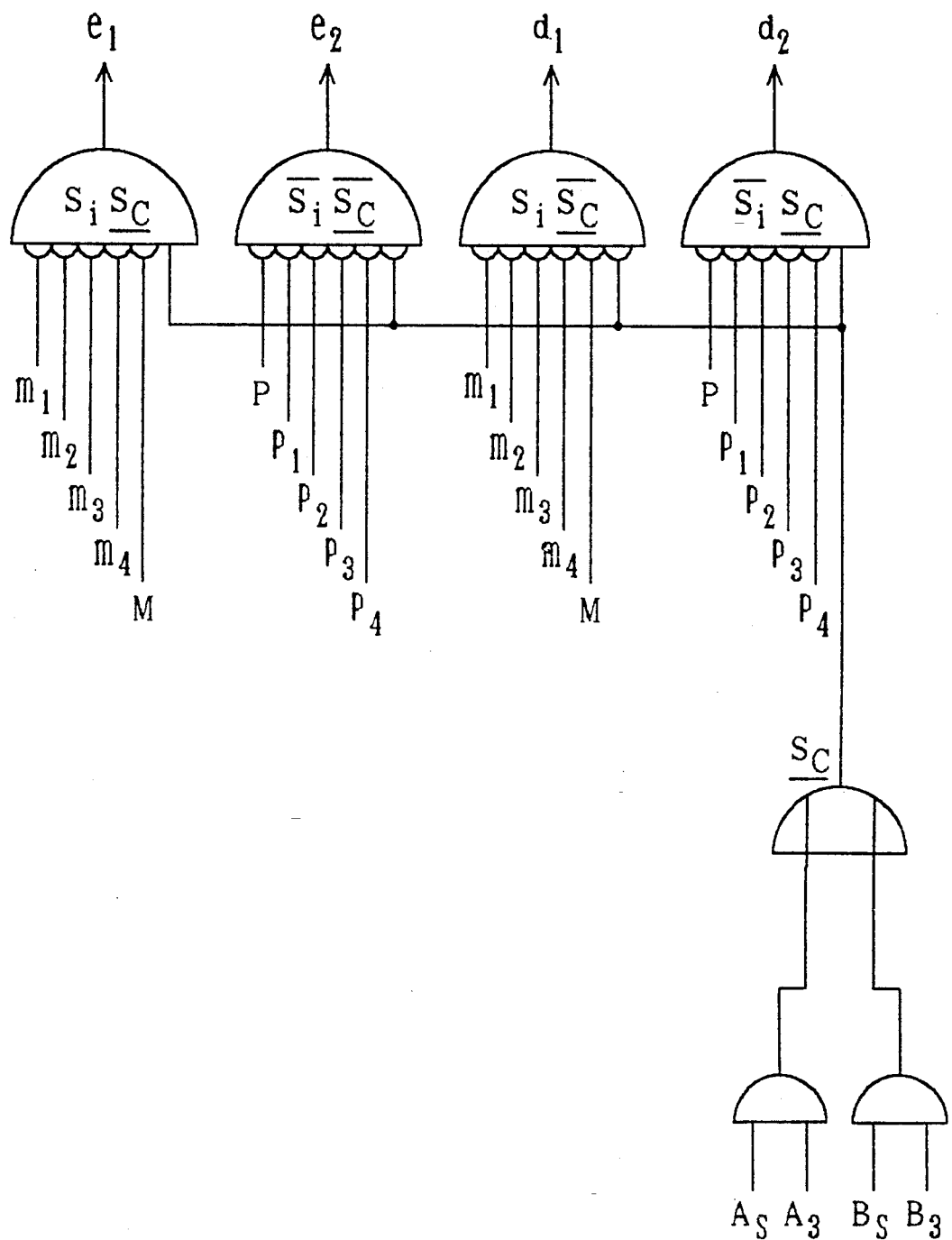

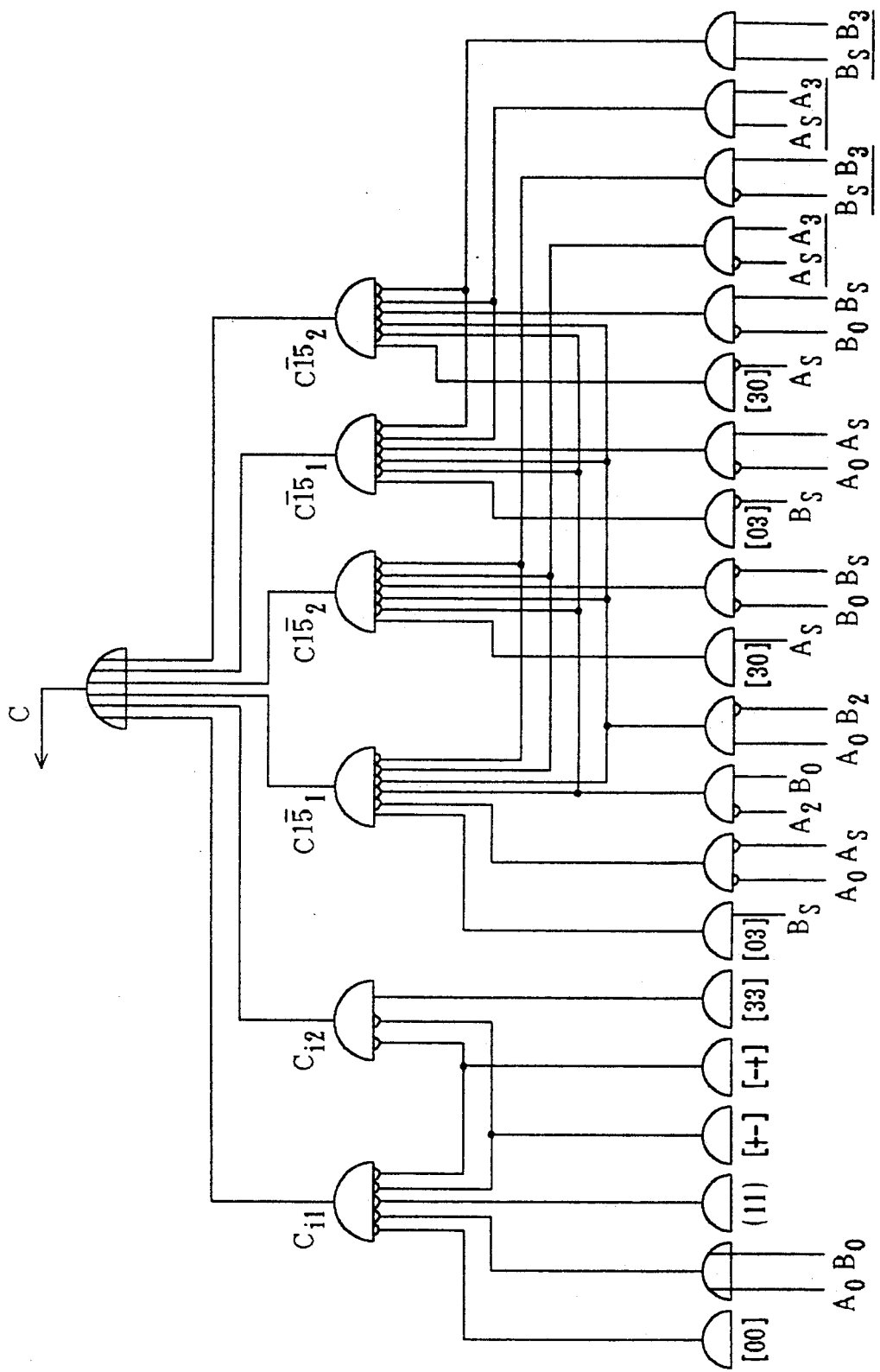
FIG.18(a) Carry circuit

FIG.19(a) Diagram of positions of carry "1$\bar{5}$"
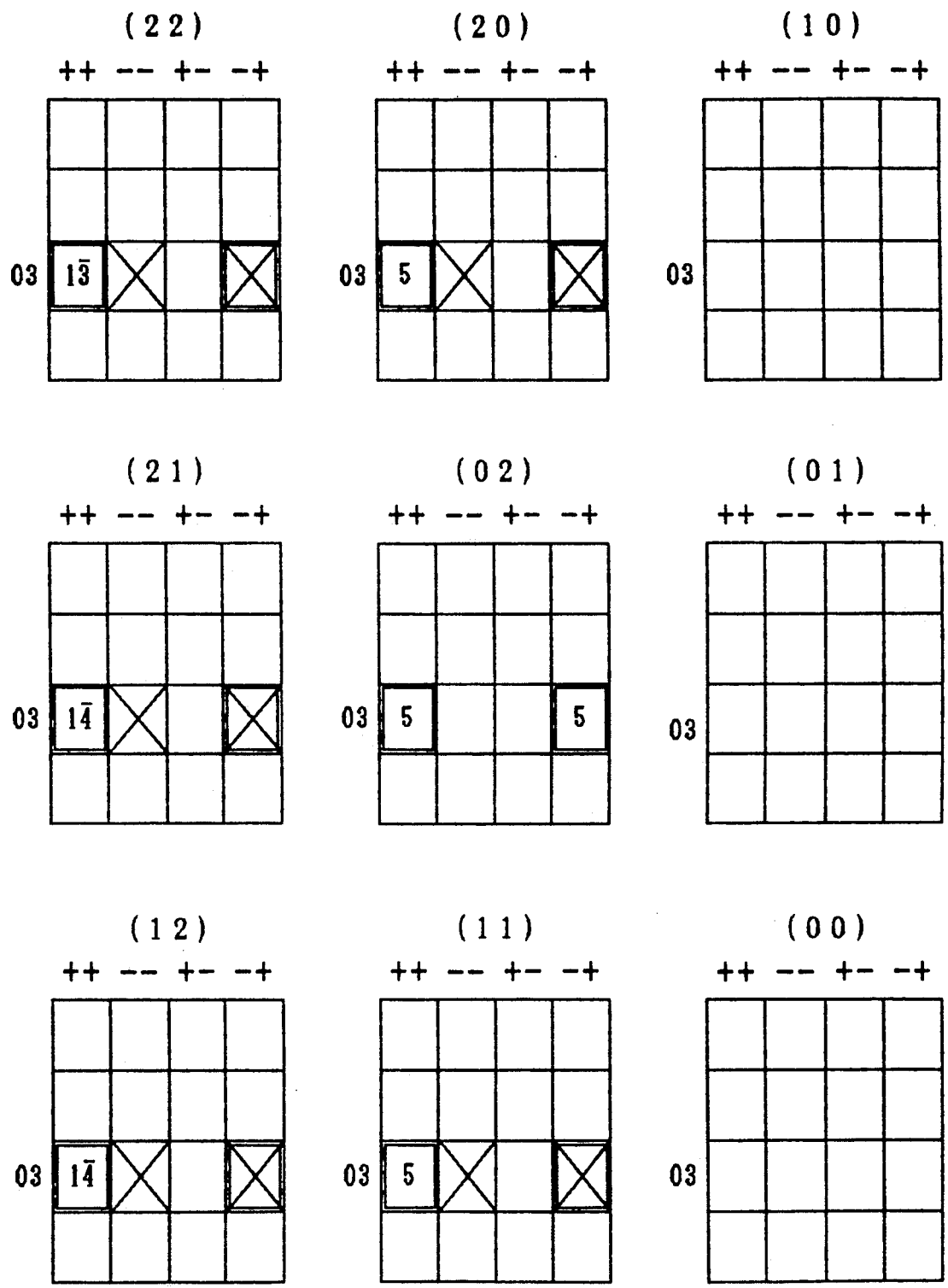

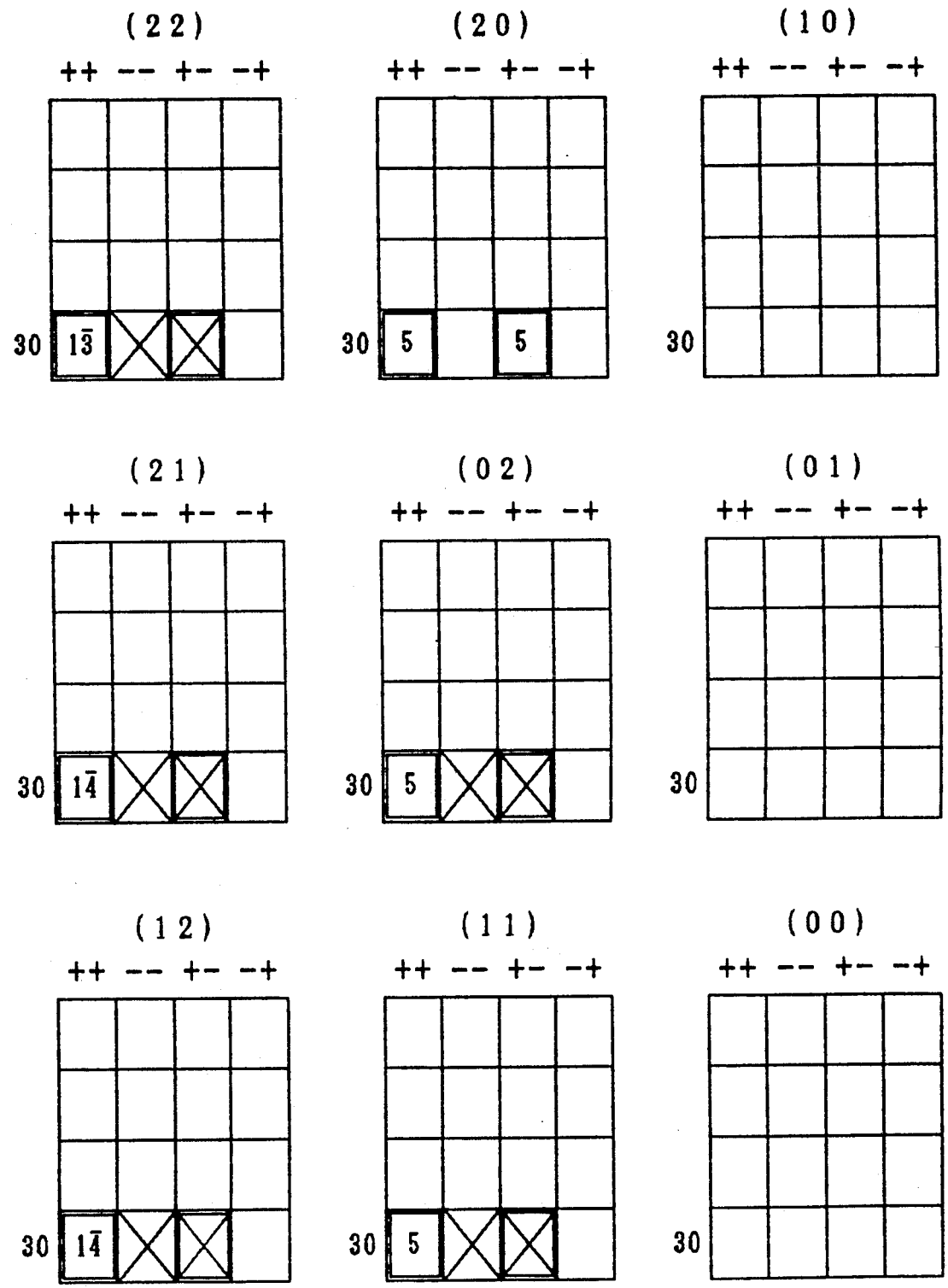
FIG.19(b) Diagram of positions of carry "1$\bar{5}$"

FIG.20  Condition of "1$\bar{5}$ ← 5"

carry

| | | | |
|---|---|---|---|
| 1 $\bar{5}$ ↑ 5 | 1 or 0 | [3 3] | $\underline{A}$ $\underline{B}$<br>1 $\bar{1}$ = 4 + 5 |
| | | [3 0] | 1 $\bar{4}$ = 4 + 2    $\underline{A}$ $\underline{B}$<br>4 = 3 + 1 |
| | | [0 0] | 3 = 2 + 1 |
| 5 ↑ 5 | $\bar{1}$ or 0 | [3 $\bar{3}$] | 1 = 4 + $\bar{3}$ |
| | | [$\bar{3}$ 0] | $\bar{1}$ 3 = $\bar{5}$ + $\bar{2}$    $\bar{4}$ = $\bar{4}$ + 0 |
| | | [$\bar{3}$ $\bar{3}$] | $\bar{1}$ 3 = $\bar{4}$ + $\bar{3}$ |

FIG.21 Condition of "$\bar{1}5 \leftarrow \bar{5}$"

carry

| | | | |
|---|---|---|---|
| $\bar{5}$ ↑ $\bar{5}$ | 1 or 0 | [3 3] | $\bar{A}$ B<br>$1\bar{1} = 4 + 5$ |
| | | [3 0] | $1\bar{4} = 4 + 2$      A B<br>                    $4 = 3 + 1$ |
| | | [3 $\bar{3}$] | $1 = 4 + \bar{3}$ |
| $\bar{1}5$ ↑ $\bar{5}$ | $\bar{1}$ or 0 | [0 0] | $3 = 2 + 1$ |
| | | [$\bar{3}$ 0] | $\bar{1}3 = \bar{5} + \bar{2}$      $\bar{4} = \bar{4} + 0$ |
| | | [$\bar{3}$ $\bar{3}$] | $\bar{1}3 = \bar{4} + \bar{3}$ |

FIG.22 Example of conventional carry propagation (right side) and example of non-propagation of carry (left side)

$$
\begin{array}{r}
3\ 3\ 5 \quad A \\
+\ 2\ 2\ 4 \quad B \\
\hline
\bar{5}\ \bar{5}\ \bar{1} \\
+\ 1\ 1\ 1 \\
\hline
1\ \bar{4}\ \bar{4}\ \bar{1}
\end{array}
\qquad
\begin{array}{r}
3\ 3\ 5 \quad A \\
+\ 2\ 2\ 4 \quad B \\
\hline
5\ 5\ \bar{1} \\
+\ \ \ \ 1 \\
\hline
5\ 6\ \bar{1} \\
\downarrow \\
5\ \bar{4}\ \bar{1} \\
+\ \ 1 \\
\hline
6\ \bar{4}\ \bar{1} \\
\downarrow \\
\bar{4}\ \bar{4}\ \bar{1} \\
+\ 1 \\
\hline
1\ \bar{4}\ \bar{4}\ \bar{1}
\end{array}
$$

FIG. 23 Cases of signs of interim sums "5" and "$\bar{5}$"

|   | 5 | 4 | 3 | 2 | 1 | 0 | A |
| + | 0 | 1 | 2 | 3 | 4 | 5 | B |
|   | 5 | 5 | 5 | 5 | 5 | 5 |   |

|   | $\bar{5}$ | $\bar{4}$ | $\bar{3}$ | $\bar{2}$ | $\bar{1}$ | 0 | A |
| + | 0 | $\bar{1}$ | $\bar{2}$ | $\bar{3}$ | $\bar{4}$ | $\bar{5}$ | B |
|   | $\bar{5}$ | $\bar{5}$ | $\bar{5}$ | $\bar{5}$ | $\bar{5}$ | $\bar{5}$ |   |

FIG.24 Diagram of sign of "5"
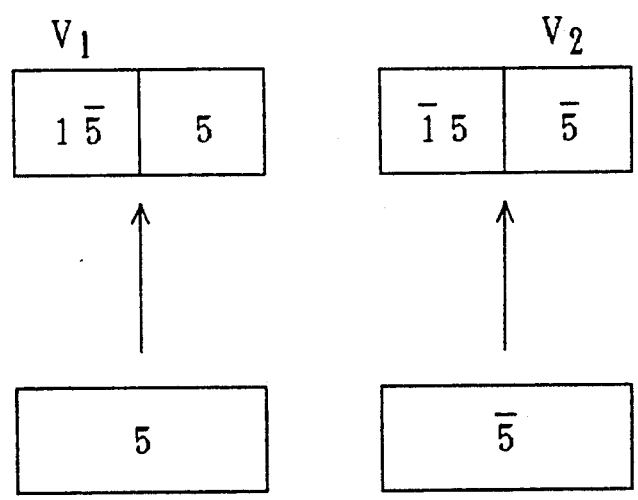

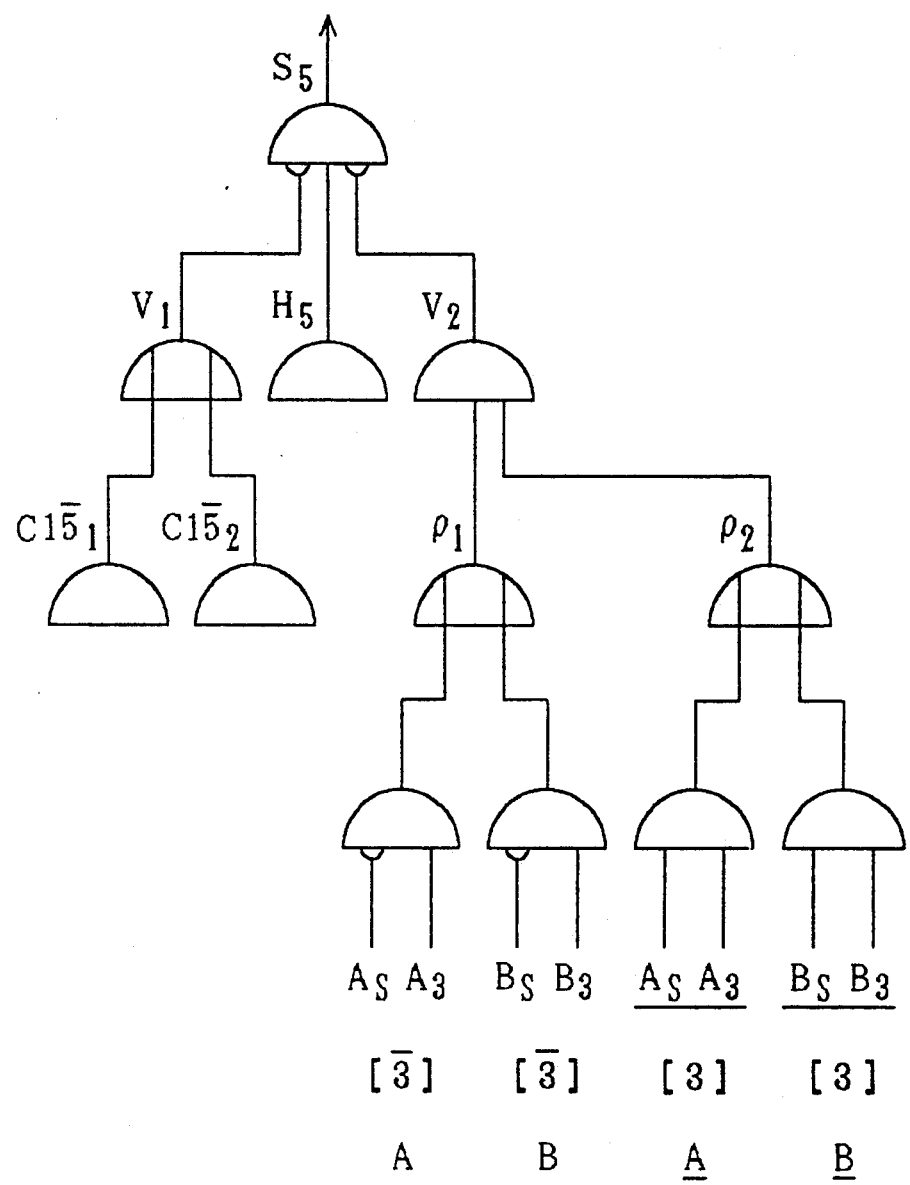
FIG.25 Circuit of sign of "5"

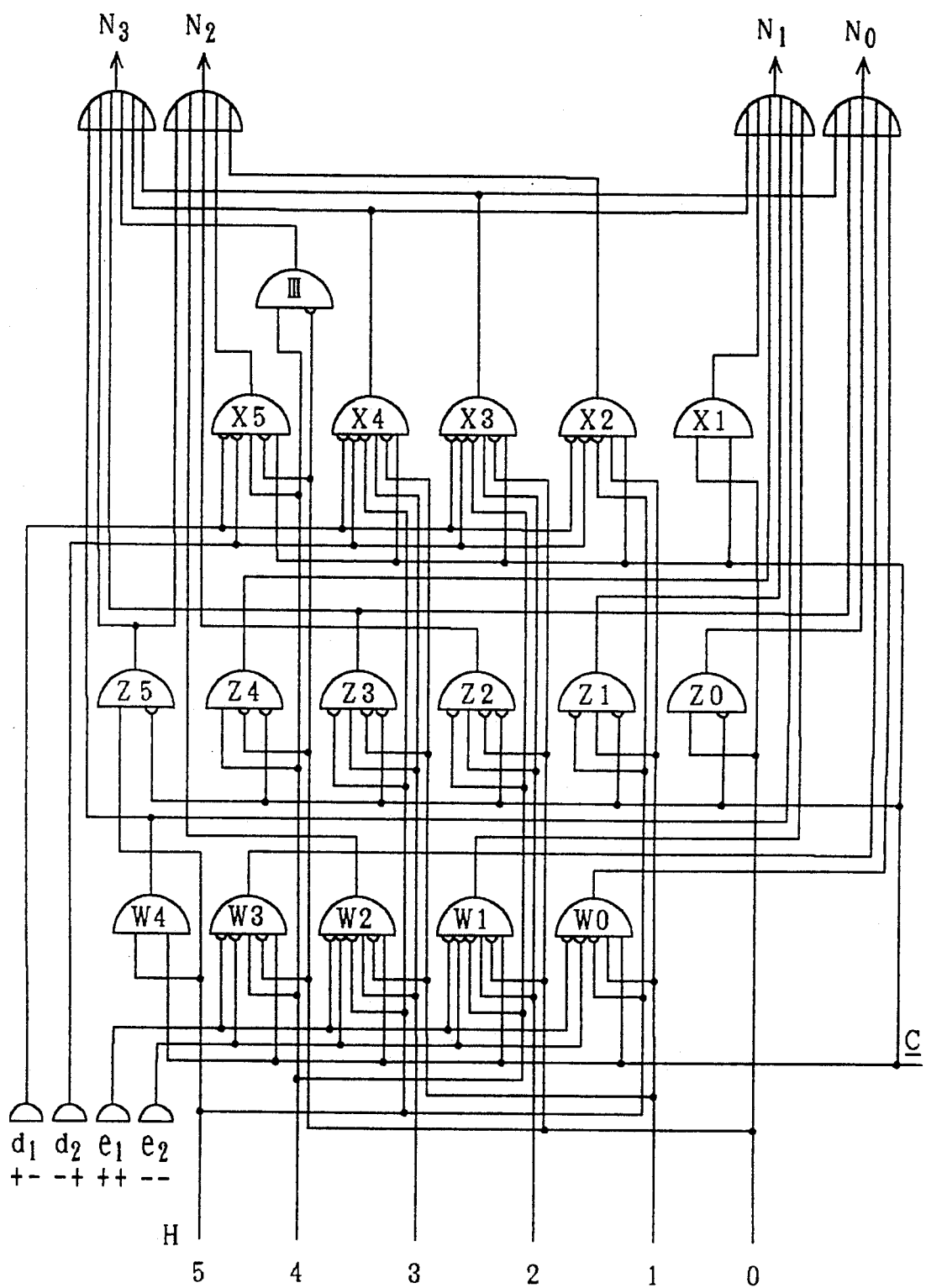
FIG.26 Carry adder

FIG.27  Final sign circuit
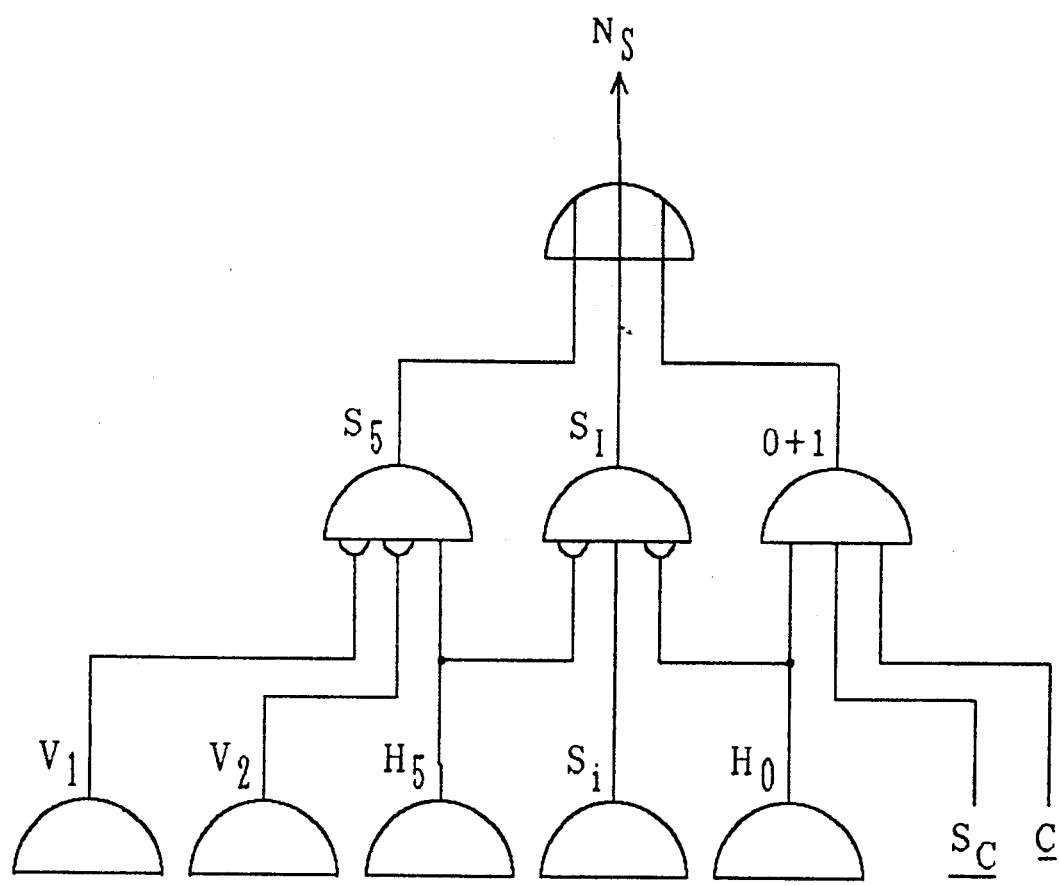

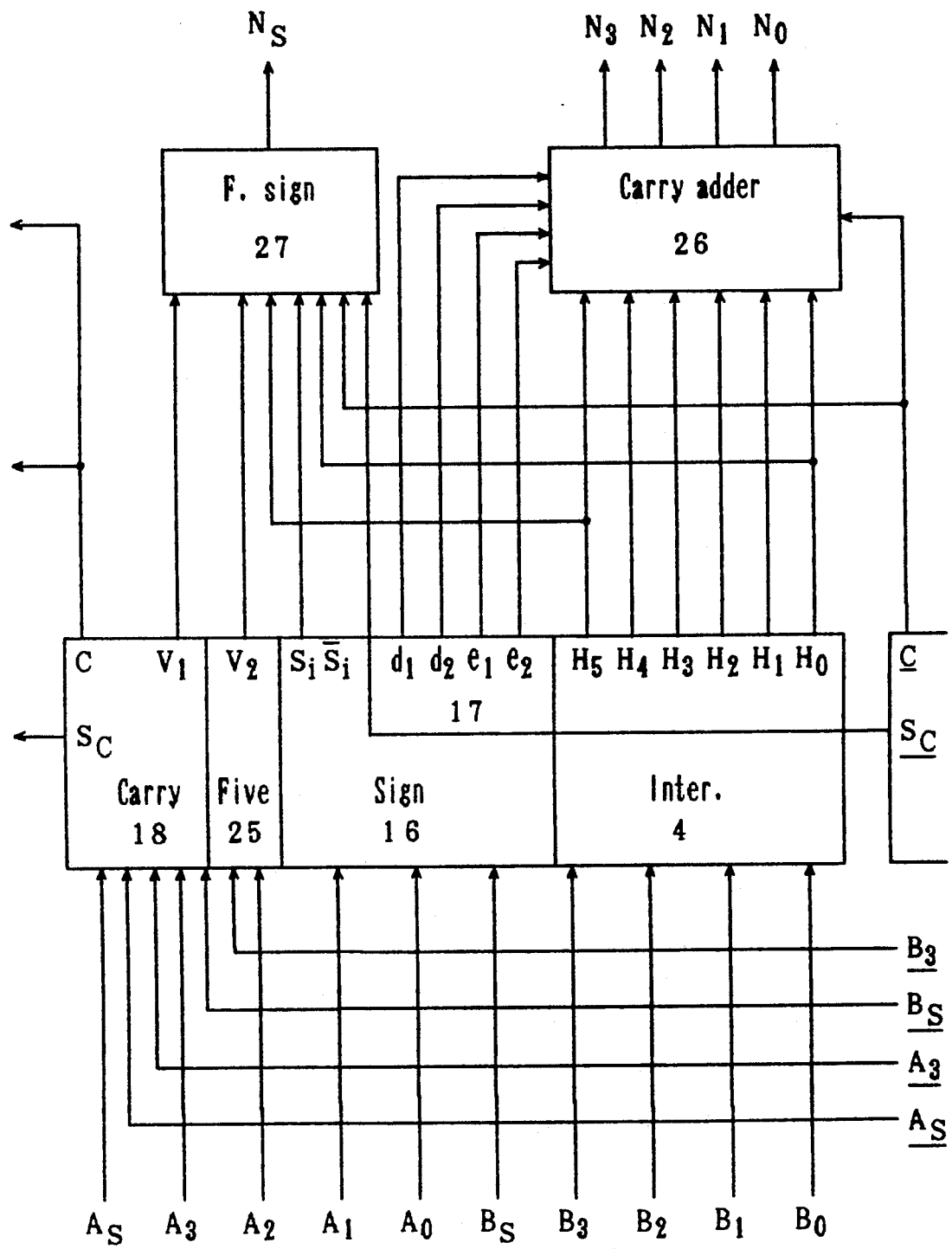
FIG.28 Whole diagram of parallel adding circuit

FIG.29 Comparison of this invention with document ⑥, SD₂ ② and binary

|  | gate-steps | gates per unit | maximum fan-in | sign of "0" |
|---|---|---|---|---|
| this invevtion | 5 | 120 | 6 | no limitation of sign |
| document ⑥ | 5 | 98 | 8 (except carry adder) | limited to be positive |
| SD₂ ② | 6 + 9 | | | |
| binary | 25 | | | |

PARALLEL ADDING CIRCUIT USING 3×3 MATRIX OF ± QUINARY NUMBER REPRESENTATION

BACKGROUND OF THE INVENTION

Field of the Invention

This invention relates to a parallel adding circuit which respectively calculates the sum of two numbers coded by ± quinary number representation and outputs the answer.

Discussion of the Related Art

± Quinary numbers treated in this invention generally has the following form:

$$A_n A_{n-1} A_{n-2} \ldots A_2 A_1 A_0$$

where $A_i$ ($i=0$ to $n$) is one of "$\bar{5}, \bar{4}, \bar{3}, \bar{2}, \bar{1}, \bar{0}, 0, 1, 2, 3, 4, 5$". The line above the numeric character is a sign for indicating a negative number. The complete number expressed by this form has the following algebraic expression:

$$\sum_{i=0}^{n} A_i \cdot 10^i$$

Examples of ±quinary numbers (corresponding to decimal numbers from $-24$ to $65$) are shown in FIG. 1. "$+5$" in decimal can be indicated by "5" or "1$\bar{5}$" in ± quinary. "$-5$" in decimal can be indicated by "$\bar{5}$" or "$\bar{1}5$" in ± quinary. In regard to zero, both "0" and "$\bar{0}$" are permitted.

A typical adding circuit uses binary numbers. This adding circuit requires a few quantity of bits, but for parallel adding, a carry-propagation exists, in which case, the parallel adding circuit becomes complex and requires about 25 gate-steps for 32 bit adding. Therefore, it is not suitable for high-speed adding. Furthermore, the conventional adding circuit uses large fan-in.

The following documents of prior art disclose high-speed calculation by using binary numbers.

(1) Signed-Digit Number Representations for Fast Parallel Arithmetic (IRE TRANSACTIONS ON ELECTRONIC COMPUTER, Sept. 1981, 389-400 page), A. Avizienis.

(2) A VLSI-Oriented High-speed Multiplier Using a Redundant Binary Addition Tree (IEICE TRANSACTIONS, Vol. J66-D, Jun. 1983, 683-690 page), N. Takagi, H. Yasuura, S. Yajima.

(3) A VLSI-Oriented High-speed Divider Using Redundant Binary Representation (IEICE TRANSACTIONS, Vol. J67-D, Apr. 1984, 450-457 page), N. Takagi, H. Yasuura, S. Yajima.

In document (1), the definition of ± quinary is disclosed in which a number for one unit can be expressed by one of "$\bar{5}, \bar{4}, \bar{3}, \bar{2}, \bar{1}, 0, 1, 2, 3, 4, 5$". This definition is almost the same as of the present invention. However, in this invention, "0" can be represented by either "0" or "$\bar{0}$". Document (1) describe that carry-propagation in parallel adding can be avoided, however, an actual circuit is not shown.

In document (1), carry-propagation is eliminated in the following way:

```
[example]    1 1 2 3 3 4 5    (augend)
          +  2 4 3 4 2 1 5    (addend)
             3 5 5 3̄ 5 5 0    (interim sum)
          ±        1     1    (carry)
             3 5 6 3̄ 5 6 0    (answer)
```

That is, in this calculation, number "6" is allowed for output in the answer. If "6" exists in the output, a 3×3 matrix system cannot be used which will be explained in detail in this specification. Instead, a 7×7 matrix (7 means the numerals "0, 1, 2, 3, 4, 5, 6") must be used, or "6" must be eliminated before the calculation. Nevertheless, the quantity of gate-steps in the adding circuit must be increased.

In the Signed-Digit method of document (2) (abbreviated as $SD_2$), an actual parallel adding circuit can be made by 6 gate-steps (as hereinafter mentioned, according to this invention the adding circuit can be made by 5 gate-steps), however, it uses double bits per unit to denote "1, 0, $\bar{1}$". Therefore, $SD_2$ method requires a considerable number of gate-steps to convert a number from $SD_2$ to Bi (Binary) for storing in memory.

The parallel adding circuit according to document (3) has high-speed with 4 gate-steps, however, it uses $SD_2$ as the dividend and Bi as the divisor, therefore, this method is only suitable for division. Further, the method shown in document (3) requires much time in the last converting process from $SD_2$ to Bi. Hence, the dividing speed is about 55% of that of the ± quinary adding circuit.

Comparing to the above mentioned prior arts, ± quinary number can be represented by 4 bits for each unit similar to the BCD (Binary-Coded Decimal). In this case, it is not necessary to convert to Bi in order to store the number in memory. Instead, it is enough to convert from ± quinary to BCD only when the answer is to be displayed as final or printed.

Furthermore, the +quinary parallel adding circuit has the speed of 5 gate-steps. Therefore, the ± quinary system has a superior performance than that as described in the prior art documents (1), (2) or (3).

The present inventor discovered a new ± quinary adding method which was different from the binary adding method. Since then, a considerable effort has been made to improve it.

The results of the inventor's research are published as follows:

(4) "Adding And Adjusting Circuits Of ± Quinary Numbers Which Is Classified To Same And Different Sign", Japanese Laid Open Publication 56-33733, Y. Sugimura and "Fast Multiplication By ± Quinary" (SYSTEMS; COMPUTERS; CONTROLS; Vol. 11 Sept.-Oct. 1980, pp. 9-19).

In these theories, one unit is indicated by a 4 bit code which consists of "S, 4, 2, 1" (where S corresponds to the sign).

Every bit is added in binary, that is, three bits for one unit are added in parallel. In these theories, if all units are constructed to add in parallel, each unit needs 210 gates and the number of gate-steps required becomes 10.

(5) "± Quinary Parallel Adding Circuit", Japanese Laid Open Publication 57-93446, Y. Sugimura.

According to this circuit, one unit is indicated by a 7 bit code consisting of "S, 5, 4, 3, 2, 1, 0". In this adding circuit, a 6×6 matrix is provided consisting of the signals "5, 4, 3, 2, 1, 0" as the augend and the signals "5, 4, 3, 2, 1, 0" as the addend. From 36 intersections, interim sums are outputted.

In this adding circuit, the gate quantity needed for each unit is decreased to 129, and gate-steps are decreased to 8.

As understood from the preceding explanation, gate-quantity and gate-steps can be decreased by using a matrix. However, in document (5), number of bits for each unit is 7 and the maximum fan-in per gate is 10. Both are still large.

(6) "± Quinary Adding 3×3 Matrix", Japanese Laid Open Publication 59-139445, Y. Sugimura.

The adding circuit in this article is constructed by a 3×3 matrix system. This method can be realized by the invention of the "S, 3, 2, 1" code (see FIG. 2). According to this code, "5~0" are shown as follows (ignoring sign S):

$$\begin{array}{ccc} 3\ 2\ 1 & 3\ 2\ 1 & 3\ 2\ 1 \quad \leftarrow \text{weights} \\ 5 = 1\ 1\ 0, & 4 = 1\ 0\ 1, & 3 = 1\ 0\ 0 \\ 2 = 0\ 1\ 0, & 1 = 0\ 0\ 1, & 0 = 0\ 0\ 0 \end{array}$$

In the above expression, if weight 3 is ignored, "5, 4, 3" and "2, 1, 0" have similar forms.

When a unit augend A is represented as follows:

$$A_s A_3 A_2 A_1 = S3\ 2\ 1,$$

only one signal of $A_2$, $A_1$, $A_0$ can be ON ($A_0$ being defined as $\overline{A_2 A_1}$, where the bar indicates NOT) (see FIG. 3).

In other words,
if $A_2$ is ON, A is "5" or "2",
if $A_1$ is ON, A is "4" or "1",
if $A_0$ is ON, A is "3" or "0".

Thus, $A_2$, $A_1$ and $A_0$ can not be ON together. Only one signal of $A_2$, $A_1$ and $A_0$ can be ON, and from one signal of $A_2$, $A_1$, $A_0$, a decision can be made on which numerals, "5, 2" or "4, 1" or "3, 0", are ON.

In the ± quinary method, "6" does not exist. If 6 (=1 1 1) is permitted, it would be possible to have both $A_2$ and $A_1$ ON. Since in ± quinary there is no "6", such a case can never occur.

Therefore, if addend B is represented by the code "$B_s B_3 2 B_1$", a 3×3 matrix constructed by signals $A_2$, $A_1$, $A_0$, and signals $B_2$, $B_1$, $B_0$ ($B_0 = \overline{B_2 B_1}$) can be arranged and only one intersection among nine intersections is allowed be ON.

Actually, there are 16 kinds of interim sums at every intersection according to the combination of $A_3 B_3$ and $A_5 B_5$ (see FIGS. 5 and 6). Based on this pattern of interim sums, only one right answer can be selected in accordance with the combinations $A_3 B_3$ and $A_5 B_5$.

In such a way, the system disclosed in document (6) has developed a parallel adding circuit which has 98 gates for each unit and 5 gate-steps, retaining 4 bits for each unit.

In the system disclosed in document (6), input "0" is always defined to be positive and carry propagation is avoided by the method in which interim sums of "5" are converted to "15" when A and B of lower unit are both positive.

(7) "± Quinary Parallel Adding Circuit And Multiplication" (IEICE TRANSACTIONS, Vol. J71-D, Feb. 1988, 193-203 page), Y. Sugimura.

This document shows an easier version of document (6), without having a matrix and has 189 gates for each unit and 6 gate-steps.

The conventional methods have the following problems which are solved by the present invention. The following table shows a comparison of 4 parallel adding circuits shown in documents (4), (5), (6) and (7).

|     | bits per unit | gates per unit | gate-steps | maximum fan-in |
| --- | --- | --- | --- | --- |
| (4) | 4 | 210 | 10 |   |
| (5) | 7 | 109 | 8  |   |
| (6) | 4 | 98  | 5  | 8* |
| (7) | 4 | 189 | 6  | 6 |

*except carry adder

As understood from the above table, (6) has the best characteristics. However, (6) has 8 maximum fan-in and input "0" is limited only to be positive, which are undesirable. When negative sign for zero is not permitted, it requires much gate-steps in multiplication and division to reverse the negative sign of zero to positive.

SUMMARY OF THE INVENTION

The present invention has been made in view of the above circumstances and has as an object of solving the problems as referred to above.

Another object is to improve the adding circuit as shown in document (6) such as to reduce the number of maximum fan-in and allow a negative zero ("$\overline{0}$").

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

According to the invention, a signal $A_0$ ($\overline{A_2 A_1}$) and a signal $B_0$ ($\overline{B_2 B_1}$) are effectively used for selecting the answer from the answer candidates outputted from a 3×3 matrix. Accordingly, with this improvement, the maximum fan-in per gate can be decreased to 6.

According to another aspect of the present invention, a code indicating the minus zero ("$\overline{0}$") is allowed to be inputted into the adding circuit. A selecting circuit for selecting an answer from the answer candidates and a conversion circuit for converting "5→15" or "$\overline{5}$→$\overline{15}$" in order to prevent carry-propagation are improved such that the adding circuit operates correctly even when the minus zero code is applied to these circuits. Accordingly, multiplying and dividing speed of the adding circuit can be increased.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

FIG. 1: ± Quinary numbers corresponding to "−24~65" in decimal numbers.

FIG. 2: "S, 3, 2, 1, 0" code for ± quinary.

FIG. 3: Register for "S, 3, 2, 1, 0" code.

FIGS. 4a and 4b: Adding circuit of interim sum.

FIG. 5: Pattern of interim sums and carries at 9 intersections.

FIG. 6: Pattern of interim sums of absolute value at 9 intersections.

FIG. 7: Relation between turned ON gates R and intersections.

FIG. 8: Target gates H of $\beta\overline{D}$, $\beta D$, $\alpha\overline{D}$ and $\alpha D$.
FIG. 9: Positions of gates E.
FIG. 10: Operations by gates E.
FIG. 11: Gates H cut by gates E in connection with intersections.
FIG. 12: Pattern of signs of interim sums "1~4".
FIG. 13: Positions of P (Plus) and M (Minus) which are common in all intersections.
FIG. 14: Four patterns of minus sign distribution.
FIG. 15: Four patterns of plus sign distribution.
FIG. 16: Sign circuit for interim sums "1~4".
FIG. 17: Selecting circuit in accordance with combinations of sign of interim sum and carry.
FIGS. 18(a) and 18(b): Carry circuit.
FIGS. 19(a) and 19(b): Diagram of positions of carry "1$\overline{5}$".
FIG. 20: Condition of "1$\overline{5}$→5".
FIG. 21: Condition of "$\overline{1}$5→$\overline{5}$".
FIG. 22: Example of conventional carry propagation (right side) and example of non-propagation of carry (left side).
FIG. 23: Cases of interim sum "5" and "$\overline{5}$".
FIG. 24: Diagram of sign of "5".
FIG. 25: Circuit of sign of "5".
FIG. 26: Carry adder.
FIG. 27: Final sign circuit.
FIG. 28: Whole diagram of parallel adding circuit.
FIG. 29: Comparison of the parallel adding circuit of this invention with document (6), SD2 (2) and binary.

DETAILED DESCRIPTION OF THE PREFERRED EMBODIMENTS

Figure 4B:
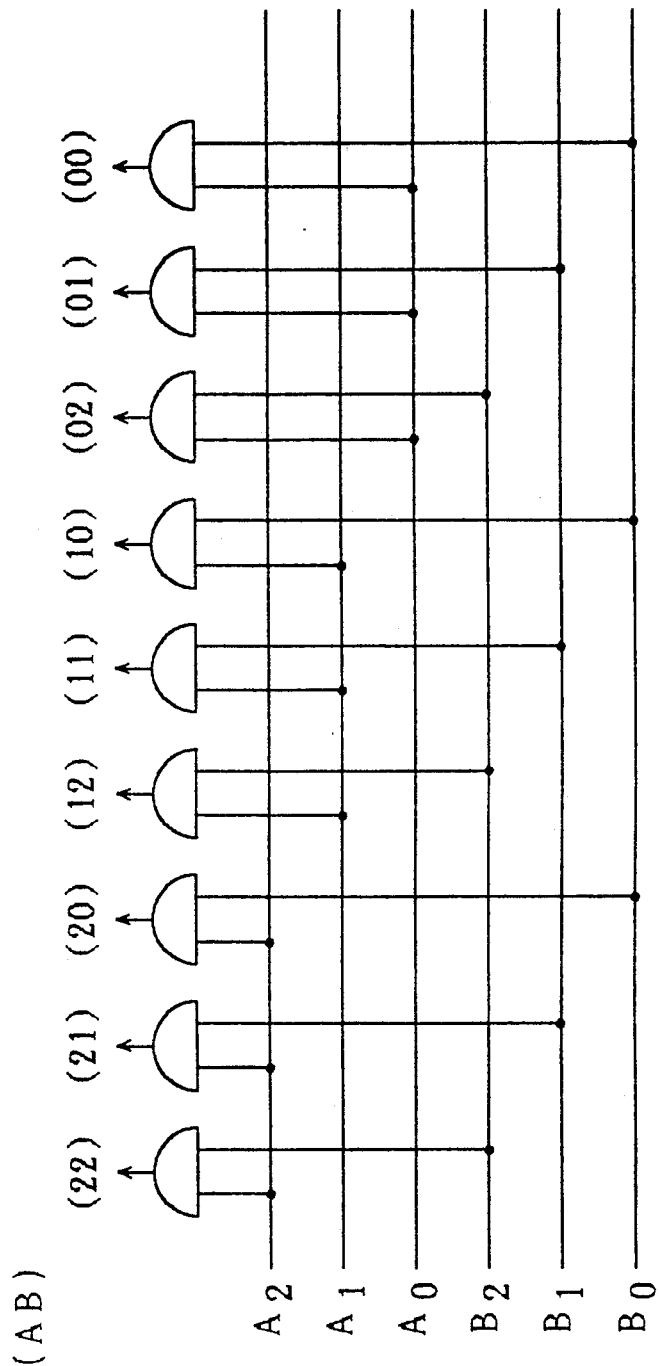

(1) ± Quinary code in this invention

In this invention, one unit X of ± quinary is coded as shown in FIG. 2. In FIG. 2, $X_s$ is a sign bit, where $X_s=1$ denotes positive sign and $X_s=0$ ($\overline{X}_s=1$) denotes negative sign. $X_3$, $X_2$, $X_1$ are numeral bits and $X_3$, $X_2$, $X_1$ have weights of 3, 2, 1, respectively.

$X_3=1$ denotes ON-signal of a bit which has weight 3.
$X_2=1$ denotes ON-signal of a bit which has weight 2.
$X_1=1$ denotes ON-signal of a bit which has weight 1.
$X_3=0$ ($\overline{X}_3=1$) denotes OFF-signal of a bit which has weight 3.
$X_2=0$ ($\overline{X}_2=1$) denotes OFF-signal of a bit which has weight 2.
$X_1=0$ ($\overline{X}_1=1$) denotes OFF-signal of a bit which has weight 1.

$X_0$ is a special bit, where $X_0$ is given by the following equation:

$$X_0 = \overline{X}_2 \overline{X}_1$$

Therefore, $X_0=1$ denotes that the signals $X_2$ and $X_1$ are both OFF.

$X_0=0$ ($\overline{X}_0=1$) denotes that one of the signals $X_2$ and $X_1$ is ON. According to this code, only one signal among $X_2$, $X_1$, $X_0$ is ON.

If $X_2$ is ON, $X_1$ and $X_0$ are both OFF.
If $X_1$ is ON, $X_0$ and $X_2$ are both OFF.
If $X_0$ is ON, $X_2$ and $X_1$ are both OFF.

Furthermore, according to this code, "5, 4, 3, 2, 1, 0" are coded as follows:

$$5 = \underset{X_3}{3} + \underset{X_2}{2}, \quad 4 = \underset{X_3}{3} + \underset{X_1}{1}, \quad 3 = \underset{X_3}{3} + \underset{X_0}{0}$$

$$2 = \underset{\overline{X}_3}{0} + \underset{X_2}{2}, \quad 1 = \underset{\overline{X}_3}{0} + \underset{X_1}{1}, \quad 0 = \underset{\overline{X}_3}{0} + \underset{X_0}{0}$$

Thus, if signals $X_3$ and $\overline{X}_3$ are ignored from consideration, every number can be denoted by only one signal from $X_2$, $X_1$ and $X_0$.

(2) 3×3 Matrix Adding

In the following description, augend A is expressed by $A=A_sA_3A_2A_1A_0$ and addend B is expressed by $B=B_sB_3B_2B_1B_0$.

Augend A can be expressed by only one signal from $A_2$, $A_1$ and $A_0$. A Also, addend B can be expressed by only one signal from $B_2$, $B_1$ and $B_0$.

Therefore, when 3×3 matrix is made by $A_2$, $A_1$, $A_0$ and $B_2$; $B_1$, $B_0$, only one intersection among 9 intersections can be ON (see FIG. 4(b)) Interim sums at intersections are shown in FIG. 5.

In FIG. 5, there are 4 kinds of $A_sB_s$ combinations $[++]$, $[--]$, $[+-]$, $[-+]$ and 4 kinds of $A_3B_3$ combinations [00], [33], [03], [30].

For example, when adding equation $$A + B = \overline{5} + 3$$

operands A and B can be expressed as follows (a bar over the numeral represents negative sign):

$$A = \underset{A_3}{\overline{3}} + \underset{A_2}{\overline{2}} \quad B = \underset{B_3}{3} + \underset{B_0}{0}$$

In this case, the combination is expressed as follows:
$A_sB_s=[-+]$: (sign combination is given by [])
$A_3B_3=[33]$: ($X_3$ combination is also given by [])
$A_2B_2=(20)$ : (intersection is given by ( ))

In FIG. 5, at the position of intersection (20) of row [33] and column [$-+$], interim sum "$\overline{2}$" is shown.

(3) Adding Circuit

FIG. 6 shows interim sums of absolute value at intersections.

FIG. 4 illustrates an adding circuit which calculates and outputs interim sums shown in FIG. 6. At the center (b) in FIG. 4, a 3×3 matrix is provided with signals $A_2$, $A_1$, $A_0$ and $B_2$, $B_1$, $B_0$.

Small circles of 9 intersections represent AND gates. Detailed connection of the 3×3 matrix (b) is shown on the lower left side of FIG. 4.

(3a) Answer candidate generation

Outputs from the 9 intersections are inputted to upper gates $R_5 \sim R_0$ of FIG. 4, in accordance with the pattern of FIG. 6.

In the pattern shown in FIG. 6, intersections which output "5~0" are given in the following table:

| | |
|---|---|
| 5 | (20) (02) (11) |
| 4 | (00) (01) (21) (22) (12) (10) |
| 3 | (00) (01) (21) (22) (11) (12) (10) |
| 2 | (20) (01) (21) (11) (12) (10) (02) |
| 1 | (20) (01) (21) (12) (10) (02) |
| 0 | (00) (22) (11) |

From the above table, following logical expressions are derived:

$$R_5 = A_2B_0 + A_0B_2 + A_1B_1$$

$$R_4 = A_0B_0 + A_0B_1 + A_2B_1 + A_2B_2 + A_1B_2 + A_1B_0$$

$$R_3 = A_0B_0 + A_0B_1 + A_2B_1 + A_2B_2 + A_1B_1 + A_1B_2 + A_1B_0$$

$$R_2 = A_2B_0 + A_0B_1 + A_2B_1 A_2B_1 + A_1B_1 + A_1B_2 + A_1B_0 + A_0B_2$$

$$R_1 = A_2B_0 + A_0B_1 + A_2B_1 + A_1B_2 + A_1B_0 + A_0B_2$$

$$R_0 = A_0B_0 + A_2B_2 + A_1B_1. \quad (1)$$

$R_4 \sim R_1$ may be simplified as follows (see FIG. 7):

$$\begin{aligned} R_4 &= \overline{A_1B_1} \cdot \overline{A_2B_0} \cdot \overline{A_0B_2} \\ R_3 &= \overline{A_2B_0} \cdot \overline{A_0B_2} \\ R_2 &= \overline{A_2B_2} \cdot \overline{A_0B_0} \\ R_1 &= \overline{A_2B_2} \cdot \overline{A_0B_0} \cdot \overline{A_1B_1}. \end{aligned} \quad (2)$$

Input-connections of gates $R_5$ and $R_0$ in FIG. 4 correspond to preceding expressions from (1) and $R_4 \sim R_1$ correspond to expressions (2). By adopting these expressions (2), the quantity of maximum fan-in of R gates are decreased from 7 of document (6) to 3 in this embodiment.

In this specification and drawings, an OR gate is shown by a gate in which input-lines go through the inside of the hemisphere, an AND gate is shown by a gate in which input-lines stop at the border line of the hemisphere, and a small hemisphere under the gate represents a NOT signal.

FIG. 7 is a table showing R gates which are turned ON when an intersection is turned ON. As understood from FIG. 6 and 7, R gates having 3 or 4 different kinds of answer-candidates are turned ON when one intersection is turned ON. Thus, answer candidates are outputted from R gate groups corresponding to the intersection defined by $A_2$, $A_1$, $A_0$ and $B_2$, $B_1$, $B_0$ signals.

(3b) Election of candidates

In the adding circuit shown in FIG. 4, signals corresponding to answer candidates outputted from R gate groups are selected by D gate groups in accordance with the combinations of $A_3B_3$, and two possible answers consisting of main-output and sub-output are selected. Main-outputs are a major group of the answers and sub-outputs are a minor group in the given case.

Detailed explanation is to follow.

(3B-1) Classification of Intersections

As shown in FIG. 7, intersections can be classified into group $\alpha$ consisting of (21) (12) (10) (01) and group $\beta$ consisting of (22) (00) (20) (02) (11).

Group $\alpha$ is defined as follows:

$A_1$ present and $B_1$ absent . . . . . . . . (12), (10) or $A_1$ absent and $B_1$ present . . . . . . . . . (21), (01).

Therefore, a signal $S\alpha$ of group $\alpha$ is defined as follows:

$$S\alpha = (A_1\overline{B_1} + \overline{A_1}B_1)$$

On the contrary, $\beta$ is defined as follows:

$A_1$ and $B_1$ both present . . . (11)

or $A_1$ and $B_1$ both absent . . . (22), (00), (20), (02).

Therefore, a signal $S\beta$ of group $\beta$ is defined as follows:

$$S\beta = (A_1B_1 + \overline{A_1}\overline{B_1}).$$

In FIG. 4, gates $\alpha D$, $\alpha \overline{D}$, $\beta D$, $\beta \overline{D}$ have the following logical expressions:

$$\alpha D = S\beta + (A_3B_3 + \overline{A_3}\overline{B_3})$$

$$\alpha \overline{D} = S\beta + (A_3\overline{B_3} + \overline{A_3}B_3)$$

$$\beta D = S\alpha + (A_3B_3 + \overline{A_3}\overline{B_3})$$

$$\beta \overline{D} = S\alpha + (A_3\overline{B_3} + \overline{A_3}B_3).$$

In these expressions,

D corresponds to [33] or [00] of $A_3B_3$ and
$\overline{D}$ corresponds to [03] or [30] of $A_3B_3$.

When an intersection of group $\alpha$ is ON, $\beta D$ and $\beta \overline{D}$ gates which have an input $S\alpha$, are always ON, therefore, $\beta D$ and $\beta \overline{D}$ gates have no influence in controlling H gate groups which input the outputs from R gate groups and D gate groups.

When an intersection of group $\beta$ in ON, $\alpha D$ and $\alpha \overline{D}$ gates which have an input $S\beta$, are always ON, therefore, $\alpha D$ and $\alpha \overline{D}$ gates have no influence in controlling H gate groups.

That is, when an intersection of group $\alpha$ in ON, $\alpha D$ and $\alpha \overline{D}$ gates control H gate groups, and when an intersection of group $\beta$ is ON, $\beta D$ and $\beta \overline{D}$ gates control H gate groups.

In this invention, by using signals $S\alpha = (A_1\overline{B_1} + \overline{A_1}B_1)$ and $S\beta = (A_1B_1 + \overline{A_1}\overline{B_1})$, the maximum quantity of fan-in for D gate groups ($\alpha D$, $\alpha \overline{D}$, $\beta D$, $\beta \overline{D}$ gates) can be decreased to "4".

The maximum quantity of fan-in for D gate groups in document (6) is "7".

(3b-2) The first selection

Selection by gate D

According to FIG. 6, at the intersections of group $\alpha$, (21), (12), (10), (01) and in the case of $\alpha D$, the main-output (major output group) is "1" and sub-output (minor output group) is "3".

Corresponding to these outputs, the output-lines from $\alpha D$ gates are connected to $H_1$ and $H_3$ gates as shown in FIG. 4.

In the case of $\alpha \overline{D}$, the main-output is "4" and sub-output is "2". Corresponding to these outputs, the output-lines from $\alpha \overline{D}$ gates are connected to $H_4$ and $H_2$ gates.

In this arrangement, at intersections (21), (12), (10) and (01) of group $\alpha$, it is forbidden to output from H gate groups the possible answers other than main-output "1" and sub-output "3" when $\alpha D$ is ON. Similarly, it is forbidden to output from H gate groups the possible answers other than main-output "4" and sub-output "2" when $\alpha \overline{D}$ is ON. For instance, if intersection (12) of group $\alpha$ is ON, gates $R_4$, $R_3$, $R_2$, $R_1$ are turned ON (see FIG. 7). In the case that gate $\alpha D$ is ON, only gates $H_1$ and $H_3$ are at standby and the gates $H_2$ and $H_4$ are not allowed to be turned ON. From these R and H gates, operation numbers "1" and "3" which are common in R and H are selected, where "1" is the main-output and "3" is the sub-output. Same operation is achieved by $\alpha \overline{D}$, $\beta D$ and $\beta \overline{D}$ gates.

Operations by $\alpha D$ and $\alpha \overline{D}$ gates are summarized as follows:

when αD ON, at (21), (12), (10), (01),  main "1",
                                         sub "3",
when α$\overline{D}$ ON, at (21), (12), (10), (01),  main "4",
                                         sub "2".

Similarly, about βD, β$\overline{D}$, it is described as follows:

βD ON, at (22), (00),    main "0",
                         sub "4",
βD ON, at (20), (02),    sub "2", X
βD ON, at (11),          main "0",
                         sub "2",
β$\overline{D}$ ON, at (22), (00),    sub "3", X
β$\overline{D}$ ON, at (20), (02),    main "5",
                         sub "1",
β$\overline{D}$ ON, at (11),          main "5",
                         sub "3".

(X-outputs "2" and "3" are always sub: see following example)

Target gates of αD, α$\overline{D}$, βD, β$\overline{D}$ are shown in FIG. 8. In FIG. 8, symbol ( ) shows the main outputs.

Example:

$$A + B = 2 + 5 = 1\overline{3}.$$

Here, A and B can be expressed as follows:

$$A = \underset{A_3}{0} + \underset{A_2}{2} \qquad B = \underset{B_3}{3} + \underset{B_2}{2}$$

Therefore,
intersection is (22),
kind of intersection is β,
$A_3B_3$ is [03], and
D gate is β$\overline{D}$.
The selection process is shown as follows:

$R_4$  $R_3$  $R_0$  gates are ON       (FIG. 7)
$H_5$  $H_3$  $H_1$  gates are at standby. (FIG. 8)

Therefore, only gate $H_3$, which is located in the same column with $R_3$ becomes ON. It matches the answer "3" which is at the position of (22), [03] and [++] in FIG. 6.

In FIG. 4, gate $h_3$ is cut by $H_5$ (when AND gate $h_3$ has an input of $\overline{H}_5$, we call "$H_5$ cuts $h_3$"). Then, if $H_5$ is ON, $h_3$ can not be ON. And, if $H_5$ is cut by E gates (right side gates in FIG. 4) $h_3$ can be ON. In such a case, "5" is called the main-output and "3" is called the sub-output.

However, in this example, $H_5$ is OFF.

Therefore, only sub-output "3" exists (see former mark X in section 3b-2).

Selection by E gates

As understood from the preceding explanation, H gates having the number corresponding to the main-output and sub-output are turned ON. These signals are further selected by E gate groups of 00E, 33E, 03$\overline{E}$ and 30$\overline{E}$ which are shown at right side in FIG. 4.

At first, the outline of gate E is explained by an example.

In an intersection (22) in FIG. 6, the main-output at rows [00] and [33] is "0", but outputs must be changed from "0" to "4" only at the position defined by 00E (at [00] row and at [++], [−−] columns). In FIG. 4, gate $H_0$ produces main-output "0". Gate $H_4 \rightarrow h_4$ produces sub-output "4", but $h_4$ is cut by $H_0$ so that $h_4$ can not be ON as long as $H_0$ is ON. Thus, $h_4$ can become ON only when $H_0$ becomes OFF by 00E. The positions defined by 00E, 33E, 03$\overline{E}$ and 30$\overline{E}$ are shown in FIG. 9.

In order to change the outputs of h gates from main-output to sub-output in a particular condition, gate 00E must work to perform this task at intersection of (22). The same operation by gate 00E is needed for intersections (21), (12) and (11). However, for intersections (10),(01),(00), such operation by gate 00E to switch from main-output to sub-output must be prohibited.

Similarly, gate 33E must work at intersections of (10), (01) (00), (11), but must not work at intersections of (22), (21) (12). Gate 03$\overline{E}$ must work at intersections of (21), (10), (20) (11), but must not work at intersections of (12), (01), (02). Gate 30$\overline{E}$ must work at intersections of (12), (02), (01), (11), but must not work at intersections of (21), (20), (10).

In FIG. 10, operations required for E gates are shown. Gates 00E, 33E, 03$\overline{E}$ and 30$\overline{E}$ are constructed based on the following logic:

$$00E = \overline{A}_3\overline{B}_3 \cdot \overline{A_s\overline{B}_s} \cdot \overline{\overline{A}_sB_s} \cdot (A_0 + B_0)$$
$$33E = A_3B_3 \cdot \overline{A_s\overline{B}_s} \cdot \overline{\overline{A}_sB_s} \cdot (A_2 + B_2)$$
$$03\overline{E} = \overline{A}_3B_3 \cdot \overline{A_s\overline{B}_s} \cdot \overline{\overline{A}_sB_s} \cdot (A_0 + B_2)$$
$$30\overline{E} = A_3\overline{B}_3 \cdot \overline{A_s\overline{B}_s} \cdot \overline{\overline{A}_sB_s} \cdot (A_2 + B_0).$$

In these logical equations, the last element for each equation corresponds to the intersections where conversion from main-output to sub-output is prohibited or the conversion has no influence on the output from h gates. In these equations, $\overline{A_s\overline{B}_s \cdot \overline{A}_sB_s}$ is used instead of $A_sB_s + \overline{A}_s\overline{B}_s$, where $A_sB_2 + \overline{A}_s\overline{B}_s$ corresponds to the condition that signs $A_s$ and $B_s$ are the same (E case). Similarly, $\overline{A_s\overline{B}_s \cdot \overline{A}_s\overline{B}_s}$ is used instead of $A_s\overline{B}_s + A_sB_s$; where $A_s\overline{B}_s + \overline{A}_sB_s$ corresponds to the condition that signs $A_s$ and $B_s$ are different ($\overline{E}$ case). According to the above conversion of the logical equations, the quantity of gate-steps is decreased.

FIG. 11 shows H gates which are cut by E gates.

At the far left side in FIG. 11, intersections where E gate operations are prohibited are shown (see FIG. 10, also).

It should be noted that below FIG. 11, FIG. 8 and Fig. 7 are shown again. Utilizing these 3 drawings, we can calculate any interim sums of A+B automatically (A, B are numerals of one unit in ± quinary).

Example 1: $A + B = 5 + 4 - 1\overline{1}$.

In this case, every operand can be expressed as follows:

$$A = \underset{A_3}{3} + \underset{A_2}{2} \qquad B = \underset{B_3}{3} + \underset{B_1}{1}$$

Where
intersection is (21),
kind of intersection is α,
$A_sB_s$ is [++],
$A_3B_3$ is [33],
kind of D is αD, and
kind of E is 33E.

| From (21) in FIG. 7 | $R_4$ | $R_3$ | $R_2$ | $R_1$ | ON |
|---|---|---|---|---|---|
| by $\alpha D$ in FIG. 8 | | $H_3$ | | $H_1$ | Standby |
| | | (sub) | | (main) | |

As understood from FIG. 11, 33E does not work on H gates when (21) is turned ON.

Then, in this example, $H_1$ is not cut.

Therefore, main-output $H_1$ and $h_1$ located on the same column as $R_1$, become ON. On the other hand, sub-output $h_3$ (located above $H_3$ in FIG. 4) is OFF, because $h_3$ is cut by $H_1$.

Therefore, the number of the h gate which is turned ON corresponds to the answer "1". This output is the same as the answer shown at the position of (21), [33], E (++) in FIG. 6.

In this case, $H_1$ is not cut by 00E since 00E is OFF. Therefore, 00E does not affect the h gate output.

Example 2: $A + B = \bar{3} + 2 = \bar{1}$

In this case, every operand is expressed as follows:

$$A = \underset{A_3}{\bar{3}} + \underset{A_0}{0} \qquad B = \underset{\bar{B}_3}{0} + \underset{B_2}{2}$$

where
intersection is (02),
kind of intersection is $\beta$,
$A_sB_s$ is $[-+]$,
$A_3B_3$ is [30],
kind of D is $\beta\bar{D}$, and
kind of E is $30\bar{E}$.

| From (02) in FIG. 7 | $R_5$ | | $R_2$ | $R_1$ | ON |
|---|---|---|---|---|---|
| by $\beta D$ in FIG. 8 | $H_5$ | $H_3$ | | $H_1$ | standby |
| | (main) | | | (sub) | |
| by $30\bar{E}$ in FIG. 11 | $H_5$ | $H_4$ | | | cut |
| absolute interim is | | | | $h_1$ | ON | are concluded.

The number of h gates which is turned ON corresponds to the answer "1" at the position of (02), [30], $\bar{E}$ (−+) in FIG. 6.

In this case, $H_1$ is not cut by 00E and 33E, since both 00E and 33E are OFF. Therefore, 00E and 33E do not disturb $H_1$'s conduction.

Example 3: $A + B = 2 + \bar{5} = \bar{3}$

The operands are given as follows:

$$A = \underset{\bar{A}_3}{0} + \underset{A_2}{2} \qquad B = \underset{B_3}{\bar{3}} + \underset{B_2}{\bar{2}}$$

The parameters are as follows:
intersection is (22),
kind of intersection is $\beta$,
$A_sB_s$ is $[+-]$,
$A_3B_3$ is [03],
kind of D is $\beta\bar{D}$, and
kind of E is $03\bar{E}$.

| From (22) in FIG. 7 | | $R_4$ | $R_3$ | | $R_0$ | ON, |
|---|---|---|---|---|---|---|
| by $\beta\bar{D}$ in FIG. 8 | $H_5$ | | $H_3$ | $H_1$ | | Standby |
| | (main) | | (sub) | (sub) | | |
| | | | | $h_3$ | | ON, | are concluded.

The number of h gates which is turned ON corresponds to the answer "3" at the position of (22), [03], $\bar{E}$ (+−) in FIG. 6.

In this case, $03\bar{E}$ cuts $H_5$, $H_4$ in FIG. 11. But, since $R_5$ is OFF, $H_5$ is OFF to begin with. Therefore, the cut operation by $03\bar{E}$ has no affect in producing the answer "3".

In such a way, it can be confirmed that right answers can be output from h gates in FIG. 4.

(3c) Sign circuit of interim sum

FIG. 12 shows signs of interim sums shown in FIG. 5.

In this invention, "+" sign $S_i$ and "−" sign $\bar{S}_i$ are used for the interim sums of "1 to 4". However, sign of "5" are derived separately and sign of "0" is allowed to be positive and negative. Therefore, currently, signs for "5" and "0" are ignored in this section.

In the pattern in FIG. 12, the following 4 positions are always either plus or zero (see FIG. 13, left). For the interim sum of zero, "+" sign $S_i$ may be outputted.

$$P_1 = \bar{A}_3\bar{B}_3 \, A_sB_s = [00] \, [++]$$
$$P_2 = A_3B_3 \, \bar{A}_s\bar{B}_s = [33] \, [--]$$
$$P_3 = A_3\bar{B}_3 \, A_s\bar{B}_s = [30] \, [+-]$$
$$P_4 = \bar{A}_3B_3 \, \bar{A}_sB_s = [03] \, [-+].$$

On the other hand, the following 4 positions are always either minus or zero (see FIG. 13, right). For the interim sum of zero "−" sign $\bar{S}_i$ may be outputted.

$$M_1 = A_3B_3 \, A_sB_s = [33] \, [++]$$
$$M_2 = \bar{A}_3\bar{B}_3 \, \bar{A}_s\bar{B}_s = [00] \, [--]$$
$$M_3 = \bar{A}_3B_3 \, A_s\bar{B}_s = [03] \, [+-]$$
$$M_4 = A_3\bar{B}_3 \, \bar{A}_sB_s = [30] \, [-+].$$

At the intersection (11), outputs at the positions other than $P_1$ to $P_4$ and $M_1$ to $M_4$ are all zero or 5, thus, sign $S_i$ and sign $\bar{S}_i$ can be determined by $P_1$ to $P_4$ and $M_1$ to $M_4$ only.

Other minus distribution of remaining 8 intersections are classified into the following 4 types (see FIG. 14).

1) columns of [++] and [−+] at (22), (21), (20)
2) columns of [++] and [+−] at (22), (12), (02)
3) columns of [−−] and [+−] at (02), (01), (00)
4) columns of [−−] and [−+] at (20), (10), (00).

However, the foregoing 4 positions of $P_1$, $P_2$, $P_3$, $P_4$ must be removed from the above expressions.

Then, type 1) (denoted by $m_1$) is given by the following expression:

$$m_1 = A_2B_s\bar{P}_1\bar{P}_4,$$

where
$A_2$ indicates (22),(21),(20),
$B_s$ indicates $[++], [-+]$.

Similarly, type 2) to type 4) are given by the following expressions:

$m_2 = B_2A_s\bar{P}_1\bar{P}_3$, where
$B_2$ indicates (22), (12), (02) and $A_s$ indicates $[++], [+-]$;
$m_3 = A_0\bar{B}_s\bar{P}_2\bar{P}_3$, where
$A_0$ indicates (02), (01), (00) and $\bar{B}_s$ indicates $[--], [+-]$;
$m_4 = B_0\bar{A}_s\bar{P}_2\bar{P}_4$, where
$B_0$ indicates (20), (10), (00) and $\bar{A}_s$ indicates $[--], [-+]$.

All minus positions are made by adding $(M = M_1 + M_2 + M_3 + M_4)$ to $(m_1 + m_2 + m_3 + m_4)$.

Therefore, minus signal is given by the following expression:

$$M + m_1 + m_2 + m_3 + m_4$$

Then, plus sign $S_i$ becomes $$S_i = \overline{m}_1 \overline{m}_2 \overline{m}_3 \overline{m}_2 \overline{M}.$$

Similarly, minus sign $\overline{S}_i$ becomes $$\overline{S}_i = \overline{p}_1 \overline{p}_2 \overline{p}_3 \overline{p}_4 \overline{P},$$

where
$p1 = A_2 \overline{B}_S \overline{M}_2 \overline{M}_3$
$p2 = B_2 \overline{A}_S \overline{M}_2 \overline{M}_4$
$p3 = A_0 B_S \overline{M}_1 \overline{M}_4$
$p4 = B_0 A_S \overline{M}_1 \overline{M}_3$
$p = P_1 + P_2 + P_3 + P_4.$ Based on these relations, sign circuit of FIG. 16 is constructed. The sign circuit comprises three gate-steps.

The maximum fan-in in this circuit is decreased to 5 while the maximum fan-in in the corresponding circuit disclosed in document (6) is 8.

(3d) Selecting the combinations of sign of interim sum and carry from lower unit In a carry adding circuit shown in FIG. 26, signals for indicating the combinations of sign of interim sum ($S_i$ or $\overline{S}_i$) and carry sign ($Sc$ or $\overline{Sc}$) from the lower unit are necessary (under-lining of alphabetic character indicates a lower unit).

In the case of "++" (interim sum is "+", and carry from lower unit is "+"), "++" signal e1 is given as follows:

$$e_1 = S_i \underline{S_c} = \overline{m}_1 \overline{m}_2 \overline{m}_3 \overline{m}_4 \overline{M} \underline{Sc}$$

Where Sc means plus sign of carry from lower unit.
In the case of "— —" (interim sum is "—", and carry from lower unit is "—"), "— —" signal $e_2$ is given as follows:

$$e_2 = \overline{S}_i \underline{\overline{S}_c} = \overline{p}_1 \overline{p}_2 \overline{p}_3 \overline{p}_4 \overline{P} \underline{\overline{Sc}}$$

Where $\overline{Sc}$ means minus sign of carry from lower unit.
In the case of "+ —" (interim sum is "+", and carry from lower unit is "—"), "+ —" signal $d_1$ is given as follows:

$$d_1 = S_i \underline{\overline{Sc}} = \overline{m}_1 \overline{m}_2 \overline{m}_3 \overline{m}_4 \overline{M} \underline{\overline{Sc}}$$

In the case of "— +" (interim sum is "—", and carry from lower unit is "+"), "— +" signal $d_2$ is given as follows:

$$d_2 = \overline{S}_i + \underline{Sc} = \overline{p}_1 \overline{p}_2 \overline{p}_3 \overline{p}_4 \overline{P} \underline{Sc}.$$

Every gate $e_1$, $e_2$, $d_1$ and $d_2$ has fan-in of 6, and the circuit comprises three gate-steps (FIG. 17).

In these expressions, Sc has the following logic:

$$\underline{Sc} = \underline{A_s A_3} + \underline{B_s B_3}$$ (the detailed description will be followed)

(3e) Carry Circuit

Two kinds of carry exist. One is a normal carry and the other is a special carry which is fed by the conversion of "$1\overline{5} \rightarrow 5$" and "$\overline{1}5 \rightarrow \overline{5}$".

(3e—1) Normal Carry

Two kinds of normal carries exist.
One kind (denoted by $C_{i1}$) is located in the rows ([33], [03] and [30]) and columns ([++] and [— —]) of the intersections (22), (12) in the pattern of FIG. 5.
$C_{i1}$ is given by the following expression:

$$C_{i1} = \overline{(A_0 + B_0)} \cdot \overline{A_1 B_1} \cdot \overline{A_3 B_3} \cdot \overline{A_s \overline{B}_s} \cdot \overline{\overline{A}_s B_s}$$

In the above expression, $\overline{A_0 + B_0}$ is a logic for realizing that $C_{i1}$ gate is not turned ON at the intersections [(20), (02), (10) (01), (00)]. These intersections have a signal of $A_0$ or $B_0$. Logic $A_0 + B_0$ indicates intersections (20), (02), (10), (01), (00).
$\overline{A_1 B_1}$ is a logic for realizing that $C_{i1}$ gate is not turned ON at the intersection (11).
$\overline{A_3 B_3}$ is a logic for realizing that $C_{i1}$ gate is not turned ON at row [00].
$\overline{A_s \overline{B}_2} \cdot \overline{\overline{A}_s B_s}$ is a logic for realizing that $C_{i1}$ gate is not turned ON at columns [+ —] and [— +].
Another kind (denoted by $C_{i2}$) is located in the row [33] and [++] and [— —] columns of every intersection.

$C_{i2}$ is given by the following expression:

$$C_{i2} = A_3 B_3 \cdot \overline{A_s \overline{B}_s} \cdot \overline{\overline{A}_s B_s}$$

Above expression shows that $C_{i2}$ gate is turned ON at row [33] of all the columns except [+ —] and [— +] at all intersections.
In several cases, both $C_{i1}$ and $C_{i2}$ gates are turned ON, however, this does not present any problems.
Gates $C_{i1}$ and $C_{i2}$, so constructed, are shown in FIG. 18(a) (first and second from left).

(3e-2) Special Carry

Special carry is the carry which is generated by conversion of interim sum "5" or "$\overline{5}$". When interim sum "5" exists, and carry "1" comes from a lower unit, answer "6" may be generated. However, in ± quinary system, numeral "6" is not permitted. Therefore, "6" must be changed to "$1\overline{4}$".
Therefore, carry "1" may be generated again. Then, the undesirable probability of carry-propagation exists.
In this invention, the following method is utilized to prevent carry-propagation. That is, when there is a probability of receiving carry "1" from the lower unit, the conversion of "$1\overline{5} \rightarrow 5$" is performed in advance.
By this method, if carry "1" is transferred from the lower unit, the calculation $\overline{5} + 1 = \overline{4}$ is performed and carry-propagation can be prevented.
If there is no carry from the lower unit, the calculation "$\overline{5} + 0 = \overline{5}$" is performed, which does not affect the calculation.
Similarly, when there is a possibility of receiving carry "$\overline{1}$" from lower unit, the conversion of "$\overline{5} \rightarrow \overline{1}5$" is performed in advance. From this conversion, carry-propagation can be prevented.

In FIG. 18(a), $C1\bar{5}_1$ and $C1\bar{5}_2$ are the gates which generate special carries "1" by the conversion "$1\bar{5}\rightarrow 5$".

$C\bar{1}5_1$ and $C\bar{1}5_2$ are the gates which generate special carries "$\bar{1}$" by the conversion "$\bar{1}5\rightarrow\bar{5}$".

Before discussing the condition of conversion, we must decide the positions of "5" and "$\bar{5}$" in the pattern shown in FIG. 5.

In document (6), these positions are classified by every column of $[++]$, $[--]$, $[+-]$ and $[-+]$.

But in this invention, we sort the kinds of positions of "5" and "$\bar{5}$" by [03]and [30]rows. The following classification is used.

In the row [03], one kind of positive "5" is located

| | | |
|---|---|---|
| at $[++]$ | of (20), | |
| at $[++], [-+]$ | of (02), | |
| and at $[++]$ | of (11). | |

These "5" are converted to "$1\bar{5}$" by the gate $C1\bar{5}_1$ in FIG. 18(a), when a certain condition, which will be explained later, is met.

In the row [30], another kind of positive "5" is located

| | | |
|---|---|---|
| at $[++], [+-]$ | of (20), | |
| at $[++]$ | of (02), | |
| and at $[++]$ | of (11). | |

These "5" are converted to "$1\bar{5}$" by the gate $C1\bar{5}_2$ in FIG. 18(a), when the same condition as that of $C1\bar{5}_1$ is met.

FIG. 19 shows the diagram in deciding the positions of "5". At the left side, the method for deciding the [03]rows is shown. At first, "5" does not exist at (10), (01) or (00).

Then, gate $C1\bar{5}_1$ of FIG. 18(a) is cut by signals $\bar{A}_2B_0$ and $A_0\bar{B}_2$.

$\bar{A}_2B_0$ denotes (10) and (00).
$A_0\bar{B}_2$ denotes (01) and (00).

We assume that at the row [03], positive "5" is located at the positions of $[++]$ and $[-+]$ columns at intersections (22), (21), (12), (20), (02), (11) (denoted by 1) in FIG. 19(a) and 19(b).

Actually there is "5" the positions of $[++]$ of (22), (21) and (12). However, this is not a problem since we are only considering plus carry "1" and these three positions always unconditionally generate plus carry "1".

Accordingly, $C1\bar{5}_1$ has an input of an AND signal ($[03]\cdot B_s$), where $B_s$ denotes $[++]$ and $[-+]$.

Furthermore, in the 12 positions (shown as [1] in FIGS. 19(a) and 19(b), five positions expressed by $[-+]$ of (22), (21), (12), (20) (11) must be eliminated (the position $[-+]$ of (02) which has the $A_0$ signal is not eliminated). Then, $C1\bar{5}_1$ has an input of $\overline{A_0A_s}$. The term $\overline{A_0A_s}$ expresses $[--]$ and $[-+]$ columns of (22), (21), (12), (20) and (11), which do not have the $A_0$ signal. Mark "X" in FIGS. 19(a) and 19(b) denotes 10 positions which have the $\overline{A_0A_s}$ expression. The $C1\bar{5}_1$ gate is constructed accordingly. The input lines from the lower unit will be explained later.

Similarly, positions of gate $C1\bar{5}_2$ adjacent to $C1\bar{5}_1$ is decided as shown in FIG. 19(b).

Next, we consider the condition necessary for lower unit $C1\bar{5}_1$ and $C1\bar{5}_2$ to work.

FIG. 20 shows the condition for "$1\bar{5}\rightarrow 5$". Augend of a lower unit is denoted by A and addend of a lower unit is denoted by BB. Numerals are classified as 5, 4, 3 group and 2, 1, 0 group.

Here, we define that,

"5, 4, 3"  are represented by [3],
"$\bar{5}, \bar{4}, \bar{3}$"  are represented by $[\bar{3}]$,
$\left.\begin{array}{l}\text{"2, 1, 0"}\\\text{"}\bar{2}, \bar{1}, 0\text{"}\end{array}\right\}$ are represented by [0].

| | $A$ | $B$ |
|---|---|---|

In FIG. 20, "$1\bar{1} = 4 + \bar{5}$" is shown by [33],
"$1\bar{4} = 4 + \bar{2}$" is shown by [30],
" $4 = 3 + 1$" is shown by [30], and
" $3 = 2 + 1$" is shown by [00].

Therefore, we can classify the two numeral addition into six cases of:

| [33] | [30], [03] | [00] | [$\bar{3}\bar{3}$], [$\bar{3}3$] | [$\bar{3}0$], [0$\bar{3}$] | [$\bar{1}\bar{3}$] |
|---|---|---|---|---|---|

The cases [33], [30], [03] and [00] (non [$\bar{3}$]) have carries 1 or 0. Then, when the lower unit is in any of these cases, conversion "$1\bar{5}\rightarrow 5$" should be performed.

By doing so, carry propagation can be prevented.

The cases [$\bar{3}\bar{3}$], [$\bar{3}3$], [$\bar{3}0$], [0$\bar{3}$], [$\bar{3}\bar{3}$] (having [$\bar{3}$]) have carries $\bar{1}$ or 0. Then, when the lower unit is in any of these cases, non-conversion, that is "$5\leftarrow 5$" is performed.

From this arrangement, carry-propagation can be prevented.

Similarly, condition of "$\bar{1}5\leftarrow\bar{5}$" is shown in FIG. 21.

When the lower unit is in any of the cases [33], [30], [03], [$\bar{3}3$] and [$3\bar{3}$] (having [3]), "1" or "0" carry may be sent from the lower unit. Then, non-conversion "$\bar{5}\leftarrow\bar{5}$" is required to prevent carry-propagation. On the other hand, when the lower unit is in any of the cases [00], [0$\bar{3}$], [$\bar{3}0$] and [$\bar{3}\bar{3}$] (non [3]), "$\bar{1}$" or "0" carry may be sent from the lower unit. Then, the conversion "$\bar{1}5\leftarrow\bar{5}$" is required to prevent carry-propagation As understood from the above mentioned analysis, $C1\bar{5}_1$ and $C1\bar{5}_2$ must have inputs $\overline{A_sA_3}$ and $\overline{B_sB_3}$, where $A_sA_3$, $B_sB_3$ mean [$\bar{3}$].
$C\bar{1}5_1$ and $C\bar{1}5_2$ must have inputs
$\overline{A_sA_3}$ and $\overline{B_sB_3}$, where $A_sA_3$, $B_sB_3$ mean [3].

Finally, it is understood that gates $C1\bar{5}_1$, $C1\bar{5}_2$, $C\bar{1}5_1$, $C\bar{1}5_2$ should have the following logical relations:

$C1\bar{5}_1 = [03] \, B_s \cdot \overline{A_0A_s} \cdot \overline{A_2B_0} \cdot \overline{A_0\bar{B}_2} \cdot \overline{\underline{A_sA_3}} \cdot \overline{\underline{B_sB_3}}$
$C1\bar{5}_2 = [30] \, A_s \cdot \overline{B_0B_s} \cdot \overline{A_2B_0} \cdot \overline{A_0\bar{B}_2} \cdot \overline{\underline{A_sA_3}} \cdot \overline{\underline{B_sB_3}}$
$C\bar{1}5_1 = [03] \, \bar{B}_s \cdot \overline{A_0A_s} \cdot \overline{A_2B_0} \cdot \overline{A_0B_2} \cdot \overline{\underline{A_sA_3}} \cdot \overline{\underline{B_sB_3}}$
$C\bar{1}5_2 = [30] \, \bar{A}_s \cdot \overline{B_0B_s} \cdot \overline{A_2B_0} \cdot \overline{A_0B_2} \cdot \overline{\underline{A_sA_3}} \cdot \overline{\underline{B_sB_3}}$
(underline denotes lower unit).

Right side of FIG. 22 shows a conventional carry addition which has carry-propagation.

Left side of FIG. 22 shows carry addition of this invention which does not have carry-propagation.

By the foregoing method, carry propagation can be prevented in this invention regardless of the sign of "0".

Figure 18B:
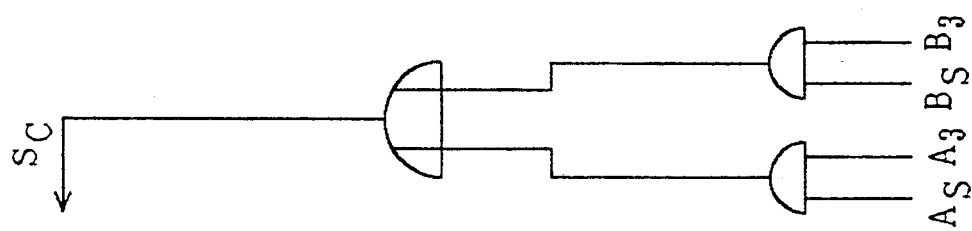

The carry circuit shown in FIGS. 18(a) and 18(b) has three gate-steps (equal to that in FIG. 6 of document (6)).

FIGS. 18(a) and 18(b) shows 6 maximum fan-in, while in document (6), the maximum fan-in is 7. Also, in document (6), sign of "0" is limited to be "+". Then, from the art in document (6), two processes are required for sign inversion as follows:

$$50\overline{4} \rightarrow \overline{504} \rightarrow 504$$

In this invention, such inconvenient processes are not required, increasing multiplying and dividing speeds.

Furthermore, in this invention, $A_0$ and $B_0$ bits are stored in registers themselves, then gates $\overline{A_0}A_s$, etc. can be made from one gate-step. If $A_0$ and $B_0$ bits are absent, $\overline{A}_0$ must be formed as $\overline{A}_2\overline{A}_1$, which increases the number of gate-steps by one more step.

Gate Sc in FIG. 18 is the gate which outputs sign of carry.

In FIG. 5, normal plus carry "1" is generated at [++].[33], [++].[03] and [++].[30].

Accordingly, this logical condition is expressed by $$A_sA_3 + B_sB_3.$$

Also, special carry sign "+1" is made by the conversion "$1\overline{5} \rightarrow 5$".

This "5" is located at [++]·[03], [−+]·[03].
[++]·[30], and [+−]·[30].

Accordingly, this logical condition is also expressed by $$A_sA_3 + B_sB_3.$$

Finally, sign Sc of positive carry is concluded to be expressed as $$Sc = A_sA_3 + B_sB_3.$$

In these conditions, normal and special negative carry "$\overline{1}$" can never be generated, since normal negative carry is at [−−].[33], [−−].[03]and [−−].[30], and special negative carry is at [−−]·[03], [+−]·[03], [−−]·[30], and [−+]·[30].

Therefore, if Sc is utilized simultaneously with the carry signal, Sc precisely describes the positive sign of carry.

(3e-3) Sign of "5"

Interim sums "5" are generated in 12 cases shown in FIG. 23. These "5" and "$\overline{5}$" are transformed to "$1\overline{5}$" and "$\overline{1}5$", respectively, according to the proceeding condition of lower unit (see FIG. 24, also).

In FIG. 24, $V_1$ is the case for "$1\overline{5} \leftarrow 5$" and $V_2$ is the case for "$\overline{5} \leftarrow \overline{5}$". Therefore, signs of last output "5" (after converting or unconverting process) should be negative at $V_1$ and $V_2$ conditions.

FIG. 25 shows the last sign $S_5$ for output "5". Gate $S_5$ exists upon gate $H_5$ which is expressed in FIG. 4. If signals $V_1$ and $V_2$ are eliminated from gate $S_5$, $S_5$ would show only positive sign of "5".

Hero is a case in which the positive sign is continued.

$$5 + \overline{1} = 4$$

where "$\overline{1}$" is a carry from a lower unit. In such a case, the positive sign continues as "$5 \rightarrow 4$".

Therefore, there is no interruption in sending signal $S_5$ to the final positive sign gate $N_s$ (FIG. 27).

Next, we must verify the situation in which $V_1$ and $V_2$ are generated. $V_1$ is formed by the following logical expression:

$$V_1 = C\overline{15}_1 + C\overline{15}_2$$

However, $V_2$ can not be expressed by a similar expression such as $$V_2 = C\overline{15}_1 + C\overline{15}_2$$

because $V_2$ is a negative sign of "5" and $C\overline{15}_1$ and $C\overline{15}_2$ are positive signs of "5". $V_2$ is derived by the following method.

At first, we must check the condition in which interim sum "$\overline{5}$" can be produced.

In FIG. 23, if either A has $\overline{A}_sA_3$ or B has $\overline{B}_sB_3$, there is a probability of producing "$\overline{5}$".

For instance, in following equation, $$A + B = \overline{5} + 0 = \overline{5},$$

$$A = \overline{5} = \overline{3} + \overline{2} \text{ has a } [\overline{3}] \text{ signal } (\overline{A}_sA_3).$$

In following equation, $$A + B = \overline{2} + \overline{3} = \overline{5},$$

$$B = \overline{3} = \overline{3} + 0 \text{ has a } [\overline{3}] \text{ signal } (\overline{B}_sB_3).$$

That is, when output of interim sum has a "$\overline{5}$" value, at least A or B must have signal [$\overline{3}$].

For this reason, $V_2$ (FIG. 25) has an input of $\rho_1$, $$\rho_1 = \overline{A}_sA_3 + \overline{B}_sB_3.$$

Of course, in spite of $\rho_1$ being ON, "$\overline{5}$" is not necessarily produced.

For instance, in the case $$\overline{4} + \overline{3} = \overline{1}3,$$

there is no output "$\overline{5}$".

But, in FIG. 25, $S_5$ has an input $H_5$, i.e., matter is limited to only the situation which has output "5".

In other words, when interim sum has a value "$\pm 5$", and $\rho_1$ is ON, then the sign of "5" is always "−".

Furthermore, "$\overline{5}$" should remain as "$\overline{5}$" when lower unit has either $A_sA_3$ or $B_sB_3$, or both (FIG. 21).

Therefore, $$V_2 = \rho_1\rho_2 = (\overline{A}_sA_3 + \overline{B}_sB_3) \cdot (\underline{A_sA_3} + \underline{B_sB_3})$$

is derived, where $$\rho_2 = \underline{A_sA_3} + \underline{B_sB_3}.$$

Finally, it is concluded that when interim sum is "$\pm 5$", "$\pm 5$" is "$\overline{5}$" if $\rho_1$ is ON, and "$\overline{5}$" remains "$\overline{5}$" if $\rho_2$ is ON.

Thus, all negative signals can be eliminated from $S_5$.

(3f) Carry Adder

Carry adder is shown in FIG. 26. From lower side of the drawing, outputs $H_5 \sim H_0$ continues from FIG. 4.

From the right side, carry $\underline{C}$ continues from lower unit of FIG. 18.

Gates X5~X1 of upper stage perform addition of interim sums and carry in absolute value.

Gates W4~W0 of lower stage perform subtraction of interim sums and carry in absolute value.

Gates Z5~Z0 of middle stage have no carry signal.

For instance, on $H_2$ column, gate X3 performs $2+1=3$ and $\bar{2}+\bar{1}=\bar{3}$, where 2 and $\bar{2}$ are interim sums, and 1 and $\bar{1}$ are carries.

Gate W1 performs $2+\bar{1}=1$ and $\bar{2}+1=\bar{1}$, where 2 and $\bar{2}$ are interim sums, and 1 and $\bar{1}$ are carries.

Gates $d_1$, $d_2$, $e_1$ and $e_2$ are the gates which are shown in FIG. 17.

Gates of X stage, except for X1, have inputs $\bar{d}_1$ and $\bar{d}_2$. Therefore, X stage gates, except for X1, are operable when the sign of interim sum and carry is the same.

When the interium sum is "0" and the carry is sent from a lower unit, the absolute sum of the interium sum and carry is "1" for both "0+1" and "0+$\bar{1}$" cases. Therefore, $\bar{d}_1$ and $\bar{d}_2$ are not input to the X1 gate.

Gates of W stage, except for W4, have inputs $\bar{e}_1$ and $\bar{e}_2$. Therefore, W stage gates, except for W4, are operable when the sign of interim sum and carry is different.

In the adding circuit of this invention, carry propagation is prevented. When the interium sum is "5" or "$\bar{5}$", the sign of carry is always different from the sign of the interium sum. The only possible cases are "$5+\bar{1}$" and "$\bar{5}+1$" but "$\bar{5}+\bar{1}$" and "$5+\bar{1}$" are not allowed. Therefore, $\bar{e}1$ and $\bar{e}2$ are not input to the W4 gate.

For instance, gate X3 is constructed as follows:

$$X3 = \bar{d}_1\bar{d}_2\bar{H}_4H_2\bar{H}_0\underline{C}$$

In the above expression,
"$H_4H_2H_0$" corresponds to
"$h_2 = \bar{H}_4H_2\bar{H}_0$" in FIG. 4.

In FIG. 26, h and H gates in FIG. 4 are combined into only one gate to save the quantity of gate-steps.

Outputs of every gate are classified by 3 2 1 0 code. According to this code, every output of every gate is sent to equivalent N gate ($N_3 N_2 N_1 N_0$ representing 3 2 1 0 code). For instance, output of gate X4 is expressed as follows:

$$4 = 3 + 1.$$

Then, from X4, signal "3" is sent to gate $N_3$ and signal "1" is sent to gate $N_1$.

Gates X5, Z4 and W3 each have an output "3". Therefore, three "3" outputs are combined into only one gate III to save the number of fan-in of gate $N_3$.

Gates X5, Z4 and W3 can be turned ON when the interium sum is "4", that is, H4 is ON and H0 is OFF. To gate III, H4 and $\bar{H}0$ signals are input. Therefore, gate III is turned ON when one of X5, Z4 and W3 gates is turned ON.

From this method, maximum fan-in is limited to 6. Also, by combining gates h and H, gate-steps of carry adder is limited to 2 steps. Furthermore, gate-steps of this parallel adding circuit is limited to 5 steps, by adding the 2 steps of the carry adder to 3 steps of interim adder shown in FIG. 4.

(3c) Final Sign Circuit

FIG. 27 shows the final sign circuit. Sign $S_5$ of "5", decided in FIG. 25, does not change even if a carry is added. Thus, signal $S_5$ is sent, without being modified, to OR gate $N_s$ (final sign). Signal $S_i$ (FIG. 16) which produces the signs for "1~4" is obtained by ignoring "5" and "0". Therefore, gate $S_i$ located above $S_i$ must be cut by signals $H_5$ and $H_0$.

In FIG. 27, $S_i$ is penetrated by positive signals of "4"~"1". Therefore, "0" signal, which is produced by the following addition, is sent to $N_s$:

$$1+\bar{1}=0,$$

where "1" is the interim sum and "$\bar{1}$" is the carry from lower unit. Only in this case, "0" sign becomes positive.

Another final output "0" generally has a "−" sign, except when outputs "0" of Z0 and W0 in FIG. 26 are sent to $N_s$.

When $H_0$ is added by positive carry, "$0+1=1$" is executed. This signal "1" is transferred to gate $N_s$ also by gate "0+1" (X1 of FIG. 26 means $0+1$ and $0+\bar{1}$).

From these procedures, the circuit of final sign $N_s$ is constructed.

(3h) Whole Figure of Parallel Adding Circuit

FIG. 28 demonstrates the whole figure of the parallel adding circuit. In the figure, carry circuit 18, five sign circuit 25, sign circuit 16, and interim sums circuit 4 are located at a lower stage (every number indicates the figure number) and have three gate-steps. At upper stage, final sign circuit 27 and carry adder 26 are located and have two gate-steps.

Signals $A_s$, $A_3$, $A_2$, $A_1$, $A_0$, $B_s$, $B_3$, $B_2$, $B_1$ and $B_0$ are at the bottom. Signals $\underline{A}_s$, $\underline{A}_3$, $\underline{B}_s$ and $\underline{B}_3$ are applied to the carry circuit 18 and the five sign circuit 25.

Signals $H_5$, $H_4$, $H_3$, $H_2$, $H_1$ and $H_0$, generated from interim sums circuit 4, are applied to the carry adder 26.

Signals $d_1$, $d_2$, $e_1$ and $e_2$, which are produced by $S_i$, $\bar{S}_i$ and Sc, are applied to the carry adder. $\underline{C}$ is also applied to the carry adder.

At the carry adder, from these eleven input signals, numeral results $N_3$, $N_2$, $N_1$ and $N_0$ are produced. At the carry circuit 18, signals Sc, C and $V_1$ are produced. At the five sign circuit 25, signal $V_2$ is produced.

Signals $V_1$, $V_2$, $S_i$, $H_5$, $H_0$, $\underline{C}$ and Sc are applied to the final sign circuit 27. At the final sign circuit, final sign signal $N_s$ is produced from these seven input signals. This parallel adding circuit has 5 gate-steps, 6 maximum fan-in and 120 gates per unit.

A comparison of gate-steps, number of gates for each unit, maximum fan-in number and signs of "0" among the present invention, document (6), $SD_2$ (2) and binary are shown in FIG. 29. FIG. 29 shows that this invention has the best performance (in $SD_2$, adding circuit itself has 6 gate-steps but conversion of $SD_2 \rightarrow Bi$ requires about 9 steps).

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A parallel adding circuit using a ±quinary number representation comprising:
   means for receiving an augend and an addend in the ± quinary number representation, said augend and said addend each having a sign bit, numeral bits and a special bit, said sign bit having one of a positive representation and a negative representation, said numeral bits including first, second and third bits representing weights of values, respectively, said special bit representing a logical relationship of said second bit and said third bit, wherein said sign bit, numeral bits and special bit can represent any ± quinary number; and
   means for adding said augend to said addend to produce a sum in the ±quinary number representation, said adding means including a plurality of gate-steps and a plurality of corresponding gates, wherein the corresponding gates of a first one of said gate-steps being coupled to said means for receiving said augend and addend, the corresponding gates of a last one of said age-steps producing said sum, and the corresponding gates of remaining ones of said gate-steps being connected in order between said corresponding gates of first and last gate-steps, each of said gates having a fan-in of at most six.

2. The parallel adding circuit according to claim 1, wherein said positive sign bit is represented by a "1" and said negative sign bit is represented by a "0".

3. The parallel adding circuit according to claim 1, wherein said first, second and third bits represent weights of three, two and one, respectively.

4. The parallel adding circuit according to claim 1, wherein said logical relationship is a logical AND of an inverse of said second bit and an inverse of said third bit.

5. The parallel adding circuit according to claim 1, wherein said plurality of said gate-steps is at most five.

6. The parallel adding circuit according to claim 1, wherein said receiving means includes a 3×3 matrix for receiving said second, third and special bits of said augend and said second, third and special bits of said addend.

7. A parallel adding circuit for adding one unit augend A and one unit addend B, said augend A and said addend B being coded in accordance with a ±quinary number representation, said parallel adding circuit comprising:
   a first register, said first register having at least five bit spaces represented by AS, A3, A2, A1, A0, and having the following format:
      the AS bit being ON when said augend A is positive,
      the A3 bit being ON when said augend A includes a weight of "3",
      the A2 bit being ON when said augend A includes a weight of "2",
      the A1 bit being ON when said augend A includes a weight of "1",
      the A0 bit being ON when both A2 and A1 bits are OFF;
   a second register, said second register having at least five bit spaces represented by BS, B3, B2, B1, B0, and having the following format:
      the BS bit being ON when said addend B is positive,
      the B3 bit being ON when said addend B includes the weight of "3",
      the B2 bit being ON when said addend B includes the weight of "2",
      the B1 bit being ON when said addend B includes the weight of "1",
      the B0 bit being ON when both B 2 and B1 bits are OFF;
   a first logic gate, said first logic gate receiving input signals from the A2 and B2 bits;
   a second logic gate, said second logic gate receiving input signals from the A2 and B1 bits;
   a third logic gate, said third logic gate receiving input signals from the Z2 and B0 bits;
   a fourth logic gate, said fourth logic gate receiving input signals from the A1 and B2 bits;
   a fifth logic gate, said fifth logic gate receiving input signals from the A1 and B1 bits;
   a sixth logic gate, said sixth logic gate receiving input signals from the A1 and B0 bits;
   a seventh logic gate, said seventh logic gate receiving input signals from the A0 and B2 bits;
   an eight logic gate, said eighth logic gate receiving input signals from the A0 and B1 bits;
   a ninth logic gate, said ninth logic gate receiving input signals from the A0 and B0 bits;
   a plurality of intermediate logic gates for outputting corresponding output signals in response tot he signals from the bits A0, A1, A2, A3, AS and the bits B0, B1, B2, B3, BS;
   a plurality of sorting logic gates for receiving corresponding input signals from said first through ninth logic gates and outputting corresponding output signals;
   a plurality of upper intermediate logic gates represented by H0, H1, H2, H3, H4 and H5, said upper intermediate logic gates receiving input signals from the output signals of said intermediate logic gates and sorting logic gates; and
   a plurality of upper logic gates represented by h1, h2, h3 and h4, said upper logic gates receiving input signals from output signals of the upper intermediate logic gates.

8. The parallel adding circuit according to claim 7, wherein said plurality of intermediate logic gates comprises:
   a first intermediate logic gate represented by $\alpha D$, said first intermediate logic gate being turned ON when one of the following bit conditions are satisfied: both the A1 and B1 bits are ON, both the A1 and B1 bits are OFF, both the A3 and B3 bits are ON, or both the A3 and B3 bits are OFF;
   a second intermediate logic gate represented by $\alpha \overline{D}$ gate, said second intermediate logic gate being turned ON when one of the following bit conditions are satisfied: both the A1 and B1 bits are ON, both the A1 and B1 bits are OFF, the A3 bit is ON and the B3 bit is OFF, or the A3 bit is OFF and the B3 bit is ON;
   a third intermediate logic gate represented by $\beta D$ gate, said third intermediate logic gate being turned ON when one of the following bit conditions are satisfied: the A1 bit is ON and the B1 bit is OFF, the A1 bit is OFF and the B1 bit is ON, both the A3 and B3 bits are ON, or both the A3 and B3 bits are OFF;
   a fourth intermediate logic gate represented by $\beta$e,ovs/D/ gate, said fourth intermediate logic gate being turned ON when one of the following bit conditions are satisfied: the A1 bit is ON and the B1 bit is OFF, the A1 bit is OFF and the B1 bit is ON, the A3 bit is ON and the B3 bit is OFF, or the A3 bit is OFF and the B3 bit is ON;

a fifth intermediate logic circuit represented by a 03$\overline{\text{E}}$ gate, said fifth intermediate logic circuit being turned OFF when said A0 bit is ON or the B2 bit is ON;

a sixth intermediate logic circuit represented by a 30$\overline{\text{E}}$ gate, said sixth intermediate logic circuit being turned OFF when said A2 bit is ON or the B0 bit is ON;

a seventh intermediate logic circuit represented by a 00E gate, said seventh intermediate logic circuit being turned OFF when the A0 bit is ON or the B0 bit is ON; and an eighth intermediate logic circuit represented by a 33E gate, said eighth intermediate logic circuit being turned OFF when the A2 bit is ON or the B2 bit is ON.

9. The parallel adding circuit according to claim 8, wherein said first, second, third and fourth intermediate logic gates are OR gates.

10. The parallel adding circuit according to claim 8, wherein said fifth and sixth intermediate logic gates represented by 03$\overline{\text{E}}$ and 30$\overline{\text{E}}$, respectively, are turned OFF when both the AS and BS bits are ON or when both the AS and BS bits are OFF; and wherein said seventh and eighth intermediate logic gates represented by 00E and 33E, respectively, are turned OFF when the AS bit is ON and the BS bit is OFF or when the AS bit is OFF and the BS bit is ON.

11. The parallel adding circuit according to claim 8, wherein said fifth, sixth, seventh, and eighth intermediate logic gates are AND gates.

12. The parallel adding circuit according to claim 7, further comprising:

a first carry logic gate represented by C1$\overline{5}$1 and a second carry logic gate represented by C1$\overline{5}$2, said first and second carry logic gates receiving:

an inverted signal from a first lower gate, said first lower gate being turned ON when the AS bit a lower unit is OFF and the A3 bit of the lower unit is ON, and an inverted signal from a second lower gate, said second lower gate being turned ON when the BS bit of the lower unit is OFF and the B3 bit of the lower unit is ON; and a third carry logic gate represented by C1$\overline{5}$1 and a fourth carry logic gate represented by C1$\overline{5}$2, said third and fourth carry logic gates receiving:

an inverted signal from a third lower gate, said third lower gate being turned ON when the AS bit of a lower unit is ON and the A3 bit of the lower unit is ON, and an inverted signal from a fourth lower gate, said fourth lower gate being turned ON when the BS bit of the lower unit is ON and the B3 bit of the lower unit is ON.

13. The parallel adding circuit according to claim 12, wherein said first carry logic gate (C1$\overline{5}$1) further receives:

a signal from a fifth lower gate, said fifth lower gate being turned ON when the A3 bit is OFF, the B3 bit is ON, and the BS bit is ON; and an inverted signal from a sixth lower gate, said sixth lower gate being turned ON when the A0 bit is OFF and the AS bit is OFF; and wherein said second carry logic gate (C1$\overline{5}$2) further receives:

a signal from a seventh lower gate, said seventh lower gate being turned ON when the A3 bit is ON, the B3 bit is OFF, and the AS bit is ON; and an inverted signal from an eight lower gate, said eighth lower gate being turned ON when the B0 bit is OFF and the BS bit is OFF; therein said third carry logic gate (C1$\overline{5}$1) further receives:

a signal from a ninth lower gate, said ninth lower gate being turned ON when the A3 bit is OFF, the B3 bit is ON, and the BS bit is OFF; and an inverted signal from an tenth lower gate, said tenth lower gate being turned ON when the A0 bit is OFF and the AS bit is ON; and wherein said fourth carry logic gate (C1$\overline{5}$2) further receives:

a signal from an eleventh lower gate, said eleventh lower gate being turned ON when the A3 bit is ON, the B3 bit is OFF, and the AS bit is OFF; and an inverted signal from a twelfth lower gate, said twelfth lower gate being turned ON when the B0 bit is OFF and the BS bit is ON.

14. The parallel adding circuit according to claim 13, wherein said fifth, sixth, seventh, eighth, ninth, tenth, eleventh, and twelfth lower gates are AND gates.

15. The parallel adding circuit according to claim 12, wherein each of said first, second, third, and fourth carry logic gates further receives:

an inverted signal from a thirteenth lower gate, said thirteenth lower gate being turned ON when the A2 bit is OFF and the B0 bit is ON; and an inverted signal from a fourteenth lower gate, said fourteenth lower gate being turned ON when the A0 bit is ON and the B2 bit is OFF.

16. The parallel adding circuit according to claim 15, wherein said thirteenth and fourteenth lower gates are AND gates.

17. The parallel adding circuit according to claim 12, wherein said first, second, third, and fourth carry logic gates are AND gates and said first, second, third, and fourth lower gates are AND gates.

18. The parallel adding circuit according to claim 7, wherein said first through said ninth logic gates are AND gates.

19. The parallel adding circuit according to claim 7, wherein one of said logic gates represented by H5, h4, h3, h2, h1 and H0 is turned ON.

20. The parallel adding circuit according to claim 7, wherein said plurality of sorting logic gates comprises:

a first sorting logic gate represented by R5, said first sorting logic gate R5 being turned ON when one of said third logic gate, said seventh logic gate and said fifth logic gate in ON;

a second sorting logic gate represented by R4, said second sorting logic gate R4 receiving an inverted signal from said third logic gate, an inverted signal from said seventh logic gate, and an inverted signal from said fifth logic gate;

a third sorting logic gate represented by R3, said third sorting logic gate R3 receiving an inverted signal from said third logic gate and an inverted signal from said seventh logic gate;

a fourth sorting logic gate represented by R2, said fourth sorting logic gate R2 receiving an inverted signal from said first logic gate and an inverted signal from said ninth logic gate;

a fifth sorting logic gate represented by R1, said fifth sorting logic gate R1 receiving an inverted signal from said first logic gate, an inverted signal from said ninth logic gate, and an inverted signal from said fifth logic gate; and a sixth sorting logic gate represented by R0, said sixth sorting logic gate R0 being turned ON when one of said first logic gate, said ninth logic gate, and said fifth logic gate is ON.

21. The parallel adding circuit according to claim 7, wherein said upper intermediate logic gates comprise:

a first upper intermediate logic gate represented by H5, said first upper intermediate logic gate H5 receiving a signal from said fourth intermediate logic gate $\beta\overline{D}$, a signal from said first sorting logic gate R5, an inverted signal from said fifth intermediate logic gate 03$\overline{E}$, and an inverted signal from said sixth intermediate logic gate 30$\overline{E}$;

a second upper intermediate logic gate represented by H4, said second upper intermediate logic gate H4 receiving a signal from said third intermediate logic gate $\beta$D, a signal from said second intermediate logic gate $\alpha$D, a signal from said second sorting logic gate R5, an inverted signal from said fifth intermediate logic gate 03$\overline{E}$, and an inverted signal from said sixth intermediate logic gate 30$\overline{E}$;

a third upper intermediate logic gate represented by H3, said third upper intermediate logic gate H3 receiving a signal from said fourth intermediate logic gate $\beta\overline{D}$, a signal from said third sorting logic gate R3, and a signal from said first intermediate logic gate $\alpha$D;

a fourth upper intermediate logic gate represented by H2, said fourth upper intermediate logic gate H2 receiving a signal from said third intermediate logic gate $\beta$D, a signal from said fourth sorting logic gate R2, and a signal from said second intermediate logic gate $\alpha\overline{D}$;

a fifth upper intermediate logic gate represented by H1, said fifth upper intermediate logic gate H1 receiving a signal from said fourth intermediate logic gate $\beta\overline{D}$, a signal from said first intermediate logic gate $\alpha$D, a signal from said fifth sorting logic gate R1, an inverted signal from said seventh intermediate logic gate 00$\overline{E}$, and an inverted signal from said eighth intermediate logic gate 33$\overline{E}$; and a sixth upper intermediate logic gate represented by H0, said sixth upper intermediate logic gate H0 receiving a signal from said third intermediate logic gate $\beta$D, a signal from said sixth sorting logic gate R0, an inverted signal from said seventh intermediate logic gate 00$\overline{E}$, and an inverted signal from said eighth intermediate logic gate 33$\overline{E}$.

22. The parallel adding circuit according to claim 7, wherein said upper logic gates comprise:

a first additional logic gate represented by h4, said first additional logic gate h4 receiving a signal from said second upper intermediate logic gate H4, and an inverted signal from said sixth upper intermediate logic gate H0;

a second additional logic gate represented by h3, said second additional logic gate h3 receiving an inverted signal from a first upper intermediate logic gate H5, a signal from said third upper intermediate logic H3, and an inverted signal from said fifth upper intermediate logic gate H1;

a third additional logic gate represented by h2, said third additional logic gate h2 receiving an inverted signal from said second upper intermediate logic gate H4, a signal from said fourth upper intermediate logic gate H2, and an inverted signal from said sixth upper intermediate logic gate H0; and a fourth additional logic gate represented by H1, said fourth additional logic gate h1 receiving an inverted signal from said first upper intermediate logic gate H5, and a signal from said fifth upper intermediate logic gate H1.

* * * * *

UNITED STATES PATENT AND TRADEMARK OFFICE
CERTIFICATE OF CORRECTION

PATENT NO. : 5,280,440
DATED : January 18, 1994
INVENTOR(S) : Yukichi Sugimura

It is certified that error appears in the above-indentified patent and that said Letters Patent is hereby corrected as shown below:

Claim 7, Column 22, Line 12, change "Z" to --A--.

Claim 7, Column 22, Line 21, change "eight" to --eighth--.

Claim 7, Column 22, Line 26, change "tot he" to --to the--.

Claim 8, Column 22, Lines 65 and 66, change "$\beta e$-,ovs/D/" to --$\beta \overline{D}$--.

Claim 8, Column 23, Line 4-17, change all instances of "logic circuit" to --logic gate--.

Claim 12, Column 23, Line 42, after "bit" insert --of--.

UNITED STATES PATENT AND TRADEMARK OFFICE
CERTIFICATE OF CORRECTION

PATENT NO. : 5,280,440
DATED : January 18, 1994
INVENTOR(S) : Yukichi Sugimura

It is certified that error appears in the above-indentified patent and that said Letters Patent is hereby corrected as shown below:

Claim 12, Column 23, Line 49, change "C1$\bar{5}$1" to --C$\bar{1}$51--.

Claim 12, Column 23, Line 50, change "C1$\bar{5}$2" to --C$\bar{1}$52--.

Claim 13, Column 24, Line 5, change "eight" to --eighth--.

Claim 13, Column 24, Line 7, change "therein" to --wherein--.

Claim 13, Column 24, Line 8, change "(C1$\bar{5}$1)" to --(C$\bar{1}$51)--.

Claim 13, Column 24, Line 12, change "an" (2nd occurrence) to --a--.

UNITED STATES PATENT AND TRADEMARK OFFICE
CERTIFICATE OF CORRECTION

PATENT NO. : 5,280,440
DATED : January 18, 1994
INVENTOR(S) : Yukichi Sugimura

It is certified that error appears in the above-indentified patent and that said Letters Patent is hereby corrected as shown below:

Claim 13, Column 24, Line 15, change "$(C1\overline{5}2)$" to --$C\overline{1}52$--.

Claim 21, Column 25, Line 21, Change "R5" to --R4--.

Claim 22, Column 26, Line 33, change "H1" to --h1--.

Signed and Sealed this

Thirty-first Day of January, 1995

Attest:

BRUCE LEHMAN

Attesting Officer     Commissioner of Patents and Trademarks